(12) United States Patent
Lambousis

(10) Patent No.: US 7,832,969 B2
(45) Date of Patent: Nov. 16, 2010

(54) LOAD RESTRAINING APPARATUS, SYSTEM AND METHOD

(76) Inventor: Geoff Lambousis, 2644 Forest Glen Dr., Marietta, GA (US) 30066

( * ) Notice: Subject to any disclaimer, the term of this patent is extended or adjusted under 35 U.S.C. 154(b) by 630 days.

(21) Appl. No.: 11/374,538

(22) Filed: Mar. 13, 2006

(65) Prior Publication Data

US 2006/0204346 A1    Sep. 14, 2006

Related U.S. Application Data

(60) Provisional application No. 60/661,362, filed on Mar. 14, 2005, provisional application No. 60/694,721, filed on Jun. 28, 2005.

(51) Int. Cl.
*B60P 7/06* (2006.01)
(52) U.S. Cl. ...................................... 410/34
(58) Field of Classification Search ............... 410/34, 410/97, 77
See application file for complete search history.

(56) References Cited

U.S. PATENT DOCUMENTS

| | | | | |
|---|---|---|---|---|
| 1,181,377 | A * | 5/1916 | Dowell | 410/97 |
| 2,449,600 | A | 9/1948 | Geiger | |
| 2,972,490 | A * | 2/1961 | Styx | 410/97 |
| 3,193,122 | A * | 7/1965 | Sauthoff | 410/40 |
| 3,504,404 | A * | 4/1970 | Strombeck et al. | 24/16 R |
| 3,685,799 | A * | 8/1972 | Wriedt | 410/96 |
| 3,807,759 | A * | 4/1974 | Vornberger | 410/50 |
| 3,972,500 | A * | 8/1976 | Johnson et al. | 410/85 |
| 4,190,165 | A * | 2/1980 | Collins | 211/60.1 |
| 4,200,046 | A | 4/1980 | Koliba et al. | |
| D316,243 | S * | 4/1991 | Henry | D12/217 |
| 5,037,255 | A * | 8/1991 | Bullock et al. | 410/30 |
| 5,193,700 | A * | 3/1993 | Lyman et al. | 220/1.5 |
| 5,425,608 | A * | 6/1995 | Reitnouer | 410/49 |
| 5,427,487 | A * | 6/1995 | Brosfske | 410/121 |
| 5,476,348 | A * | 12/1995 | Shelleby | 410/49 |
| 5,871,316 | A * | 2/1999 | Bills | 410/42 |
| 5,888,039 | A * | 3/1999 | Cooley | 410/50 |
| 6,030,158 | A | 2/2000 | Tatina et al. | |
| 6,851,902 | B2 | 2/2005 | Stanley | |
| 6,948,895 | B2 * | 9/2005 | Buff | 410/104 |
| 6,974,288 | B2 * | 12/2005 | Tatina | 410/106 |
| 7,350,843 | B2 * | 4/2008 | Meyers et al. | 296/50 |
| 2006/0065687 | A1 * | 3/2006 | Reed | 224/404 |
| 2007/0086873 | A1 * | 4/2007 | Rivera | 410/97 |

* cited by examiner

*Primary Examiner*—H Gutman
(74) *Attorney, Agent, or Firm*—Woodcock Washburn LLP

(57) ABSTRACT

Load restraining apparatuses, systems and methods are provided. In general, in the several embodiments, a load restraining apparatus can include a base, a load restraining component, and anchor. In other embodiments, a load restraining apparatus can include one or more strap blocks, each having a base block, top plate, and outer lip, the base blocks having through slots through which a strap can be threaded and wrapped upon itself with a ratchet. In other embodiments, a load restraining apparatus can include a mounting plate having orthogonally arranged ratchets each connected to a strap for wrapping around or along a load, one strap connected to a strap coupler having additional straps connected to the coupler.

15 Claims, 27 Drawing Sheets

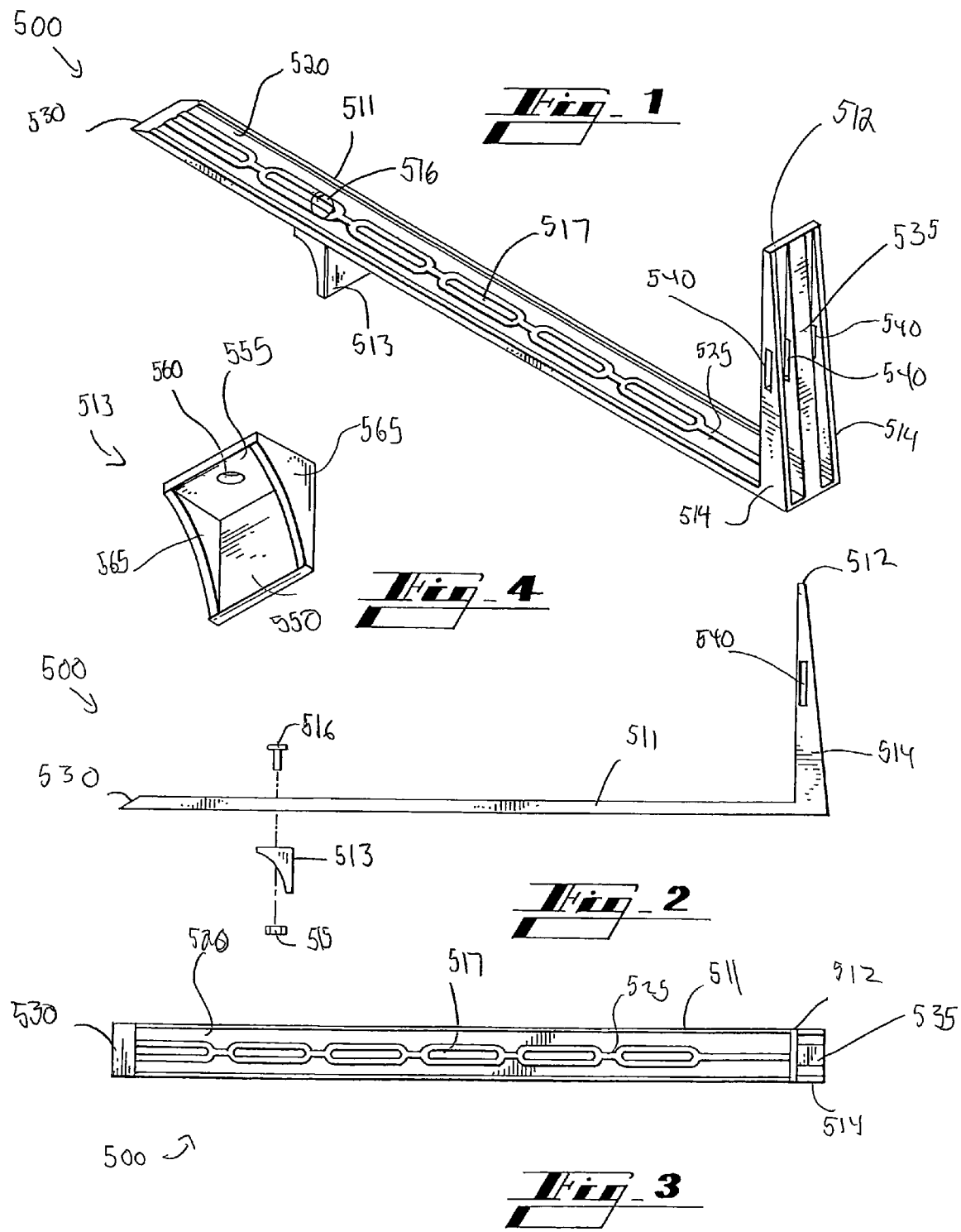

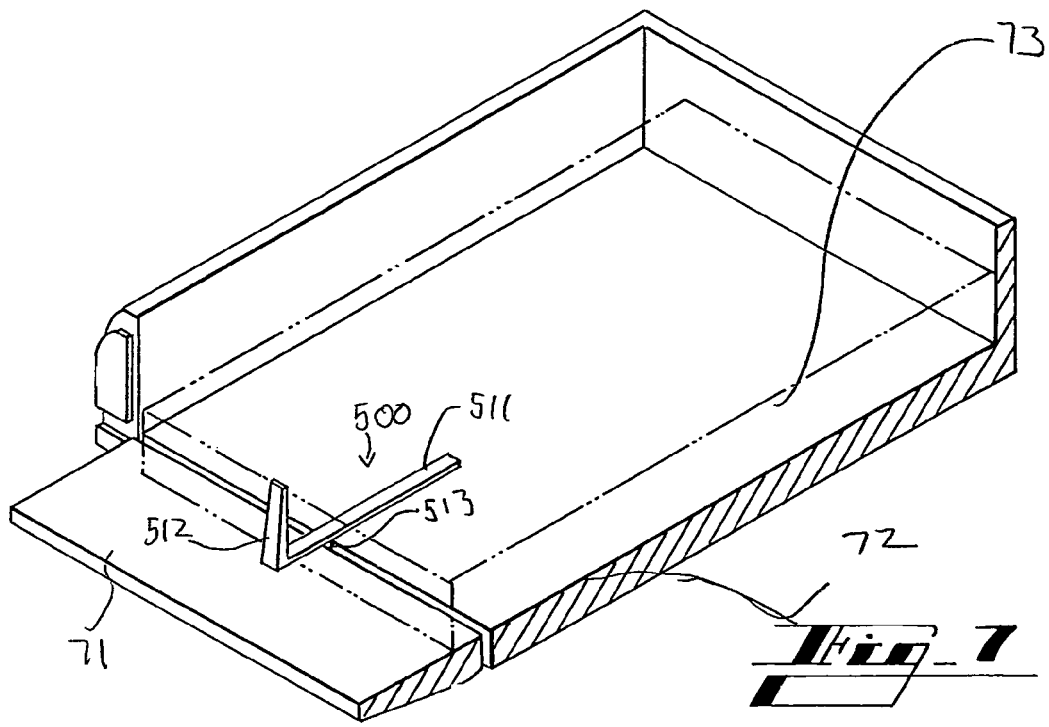
Fig_7
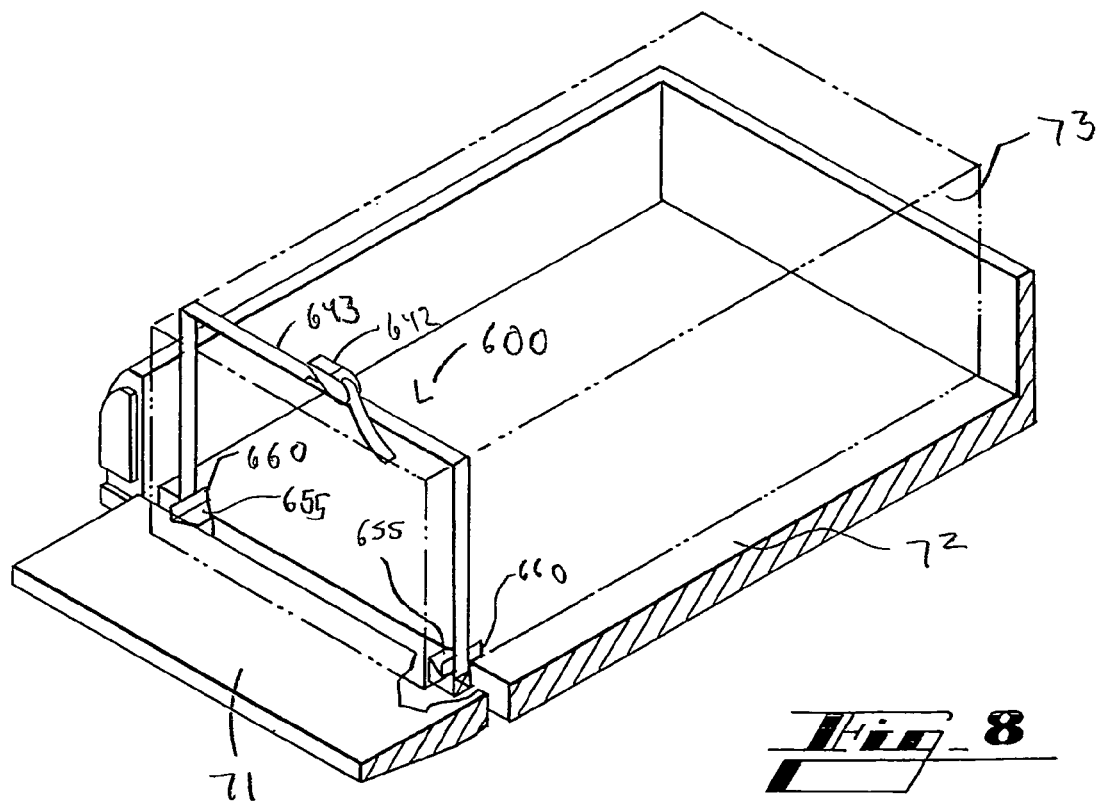
Fig_8

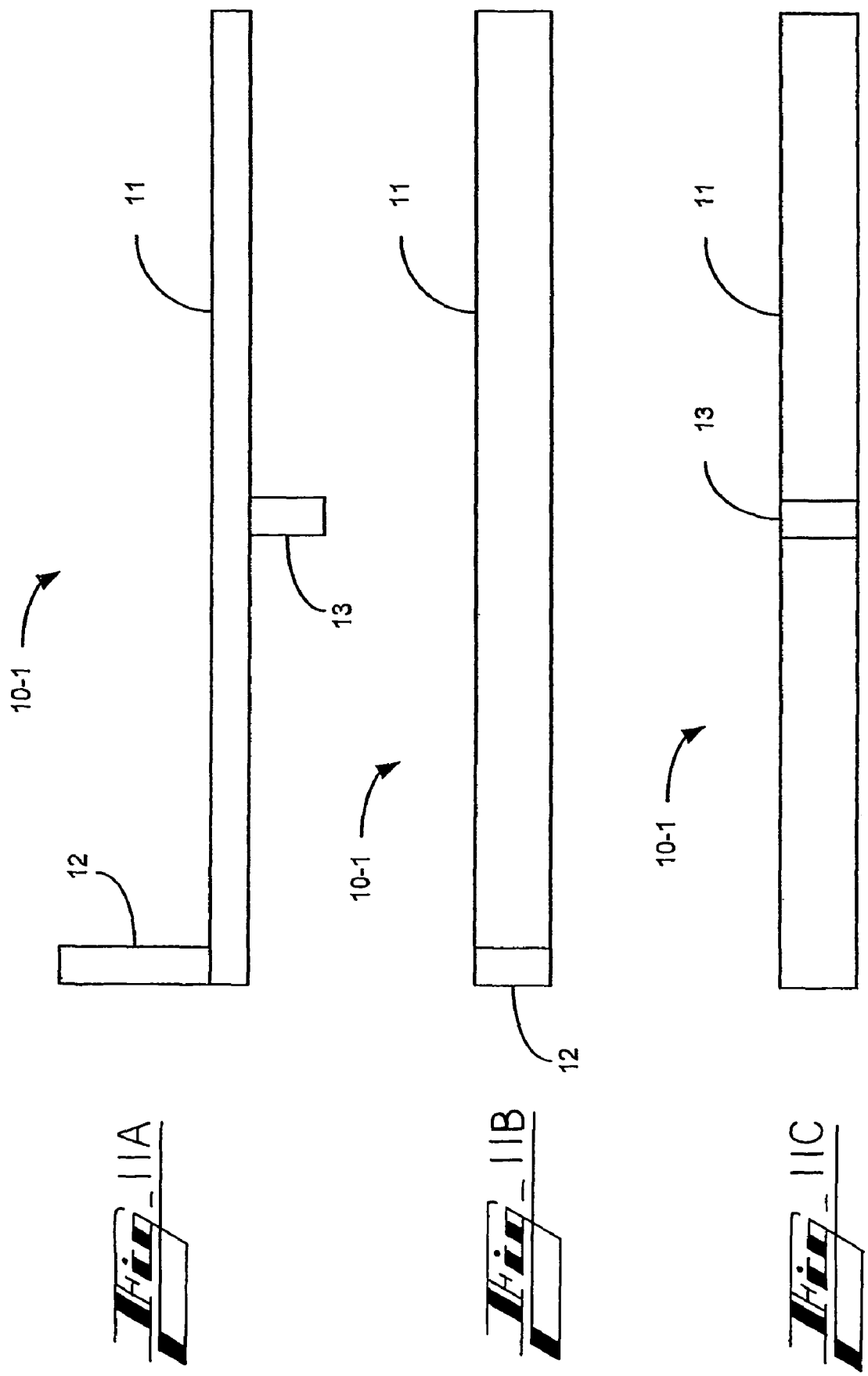

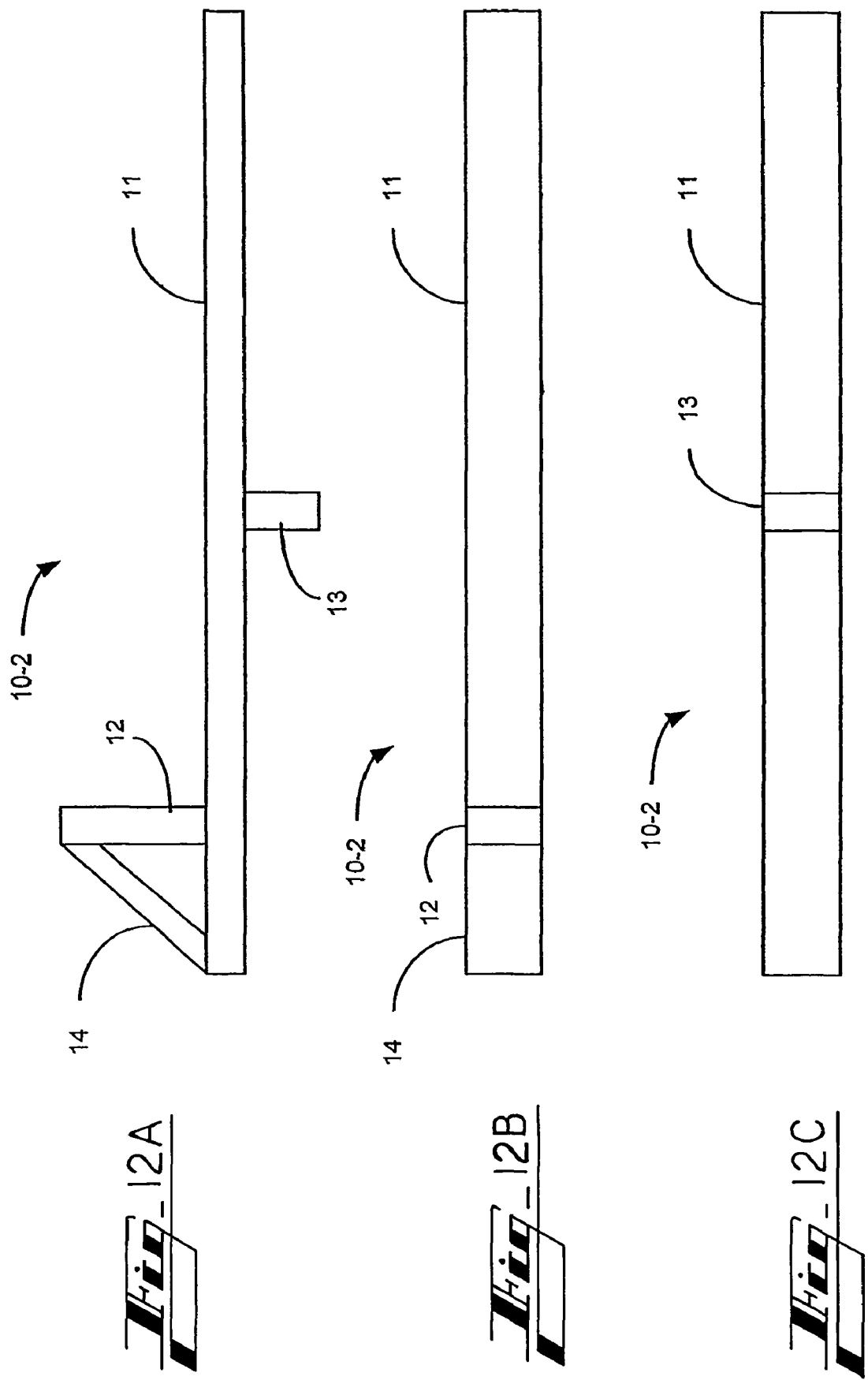

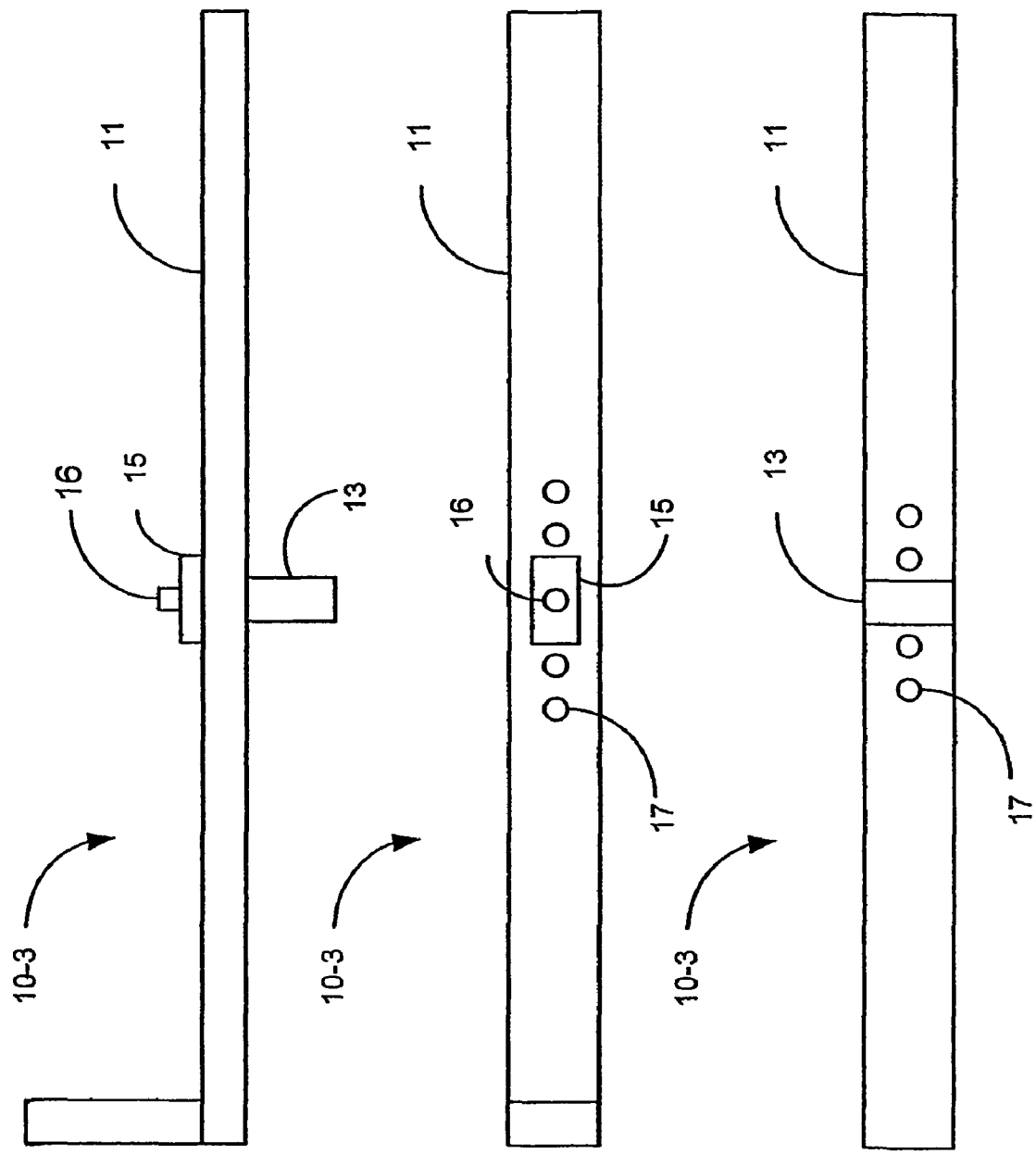

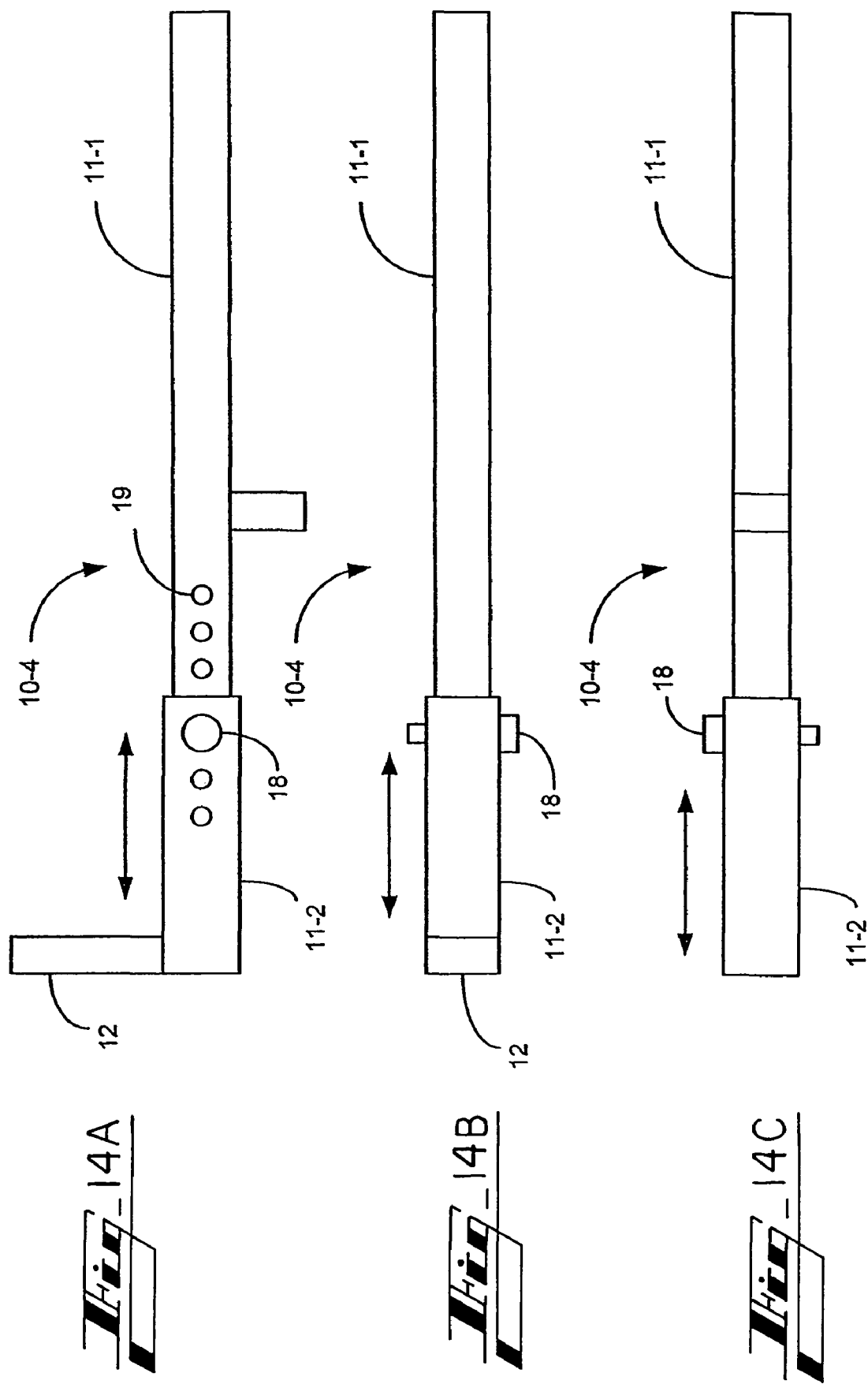

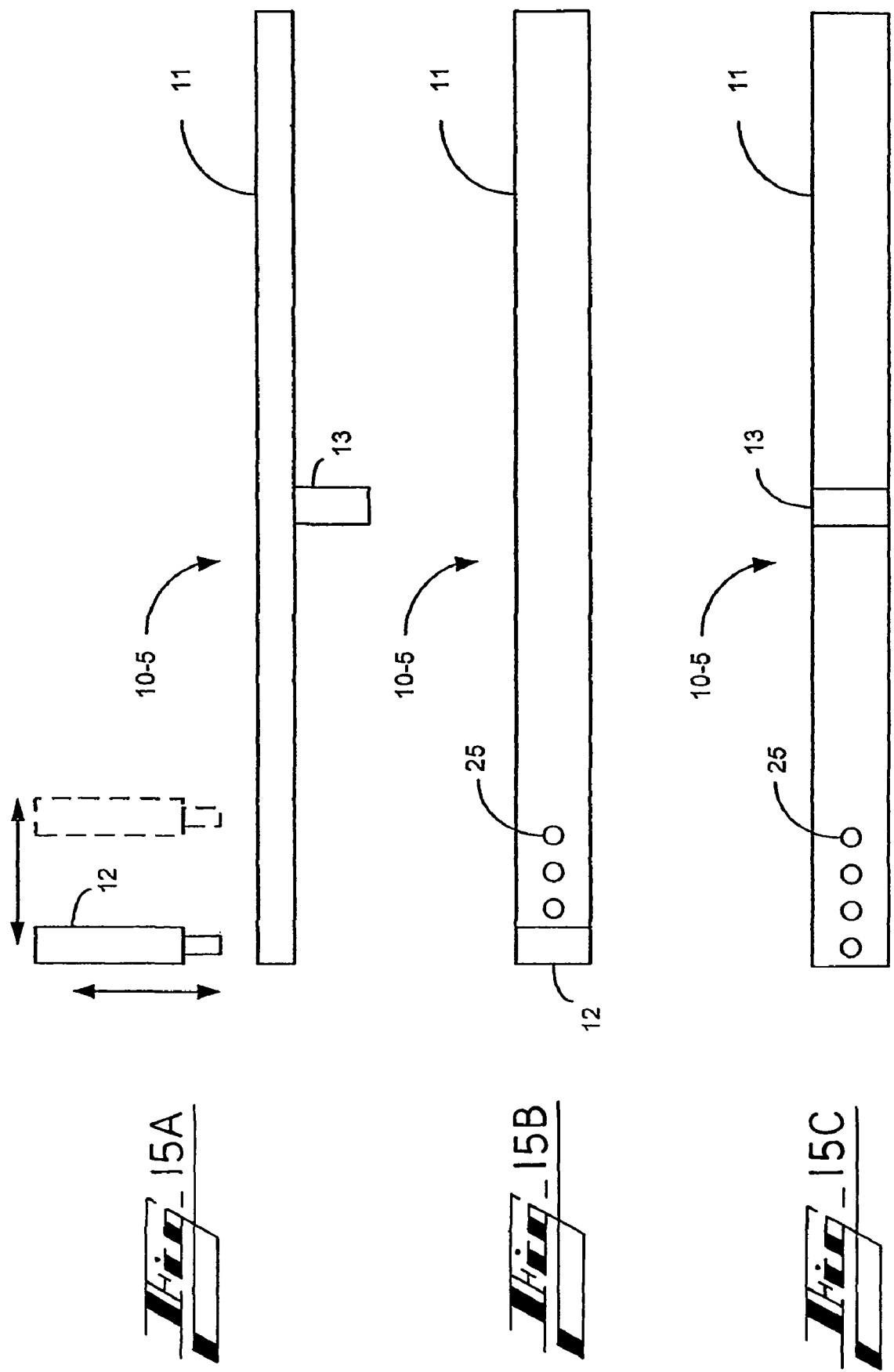

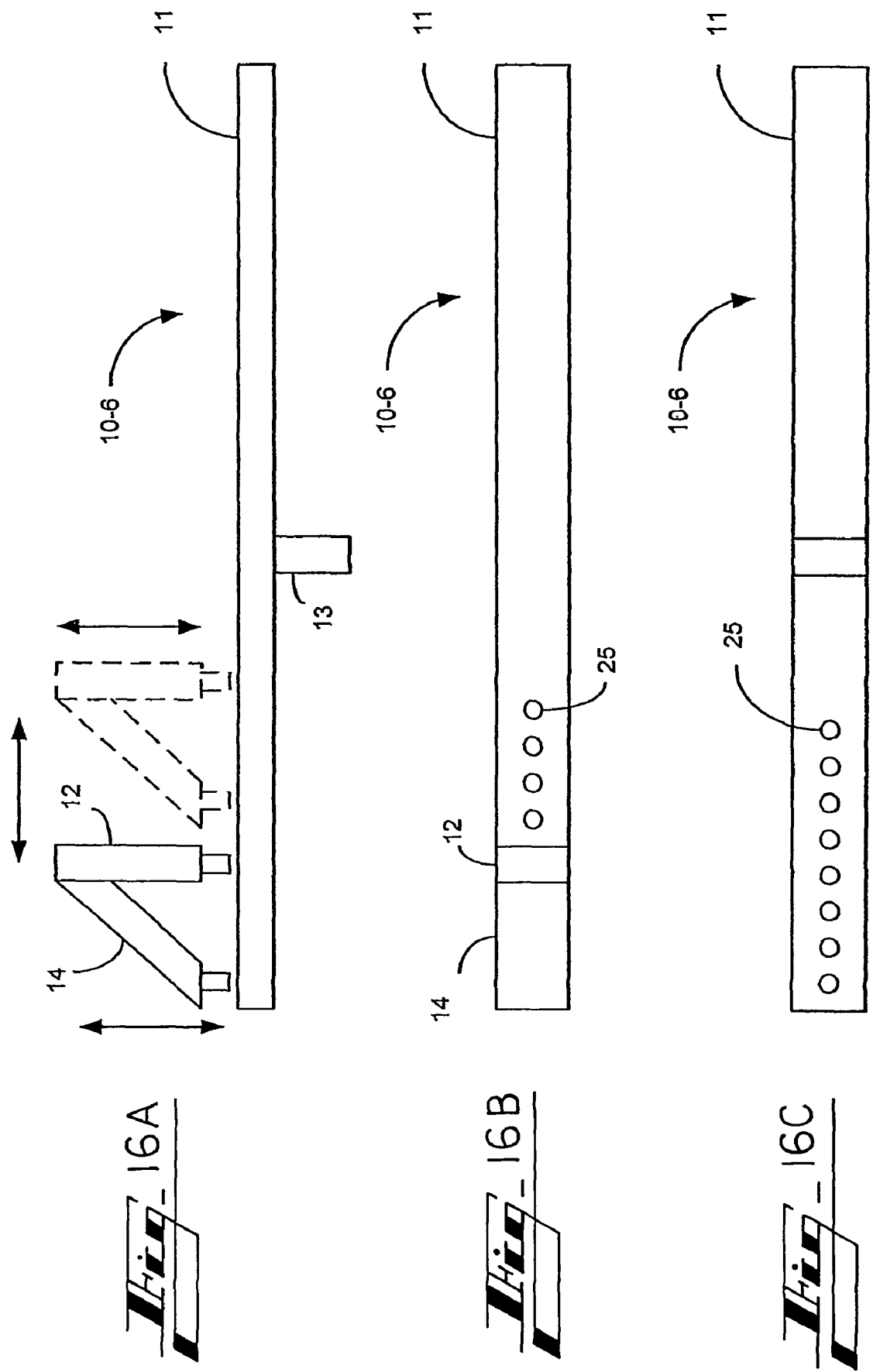

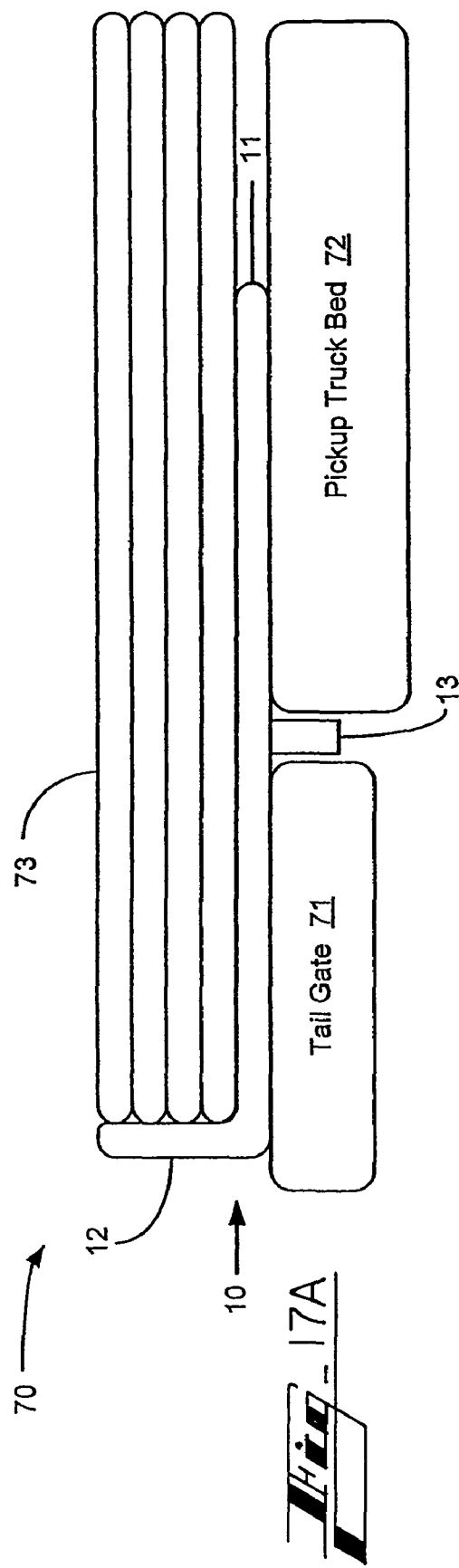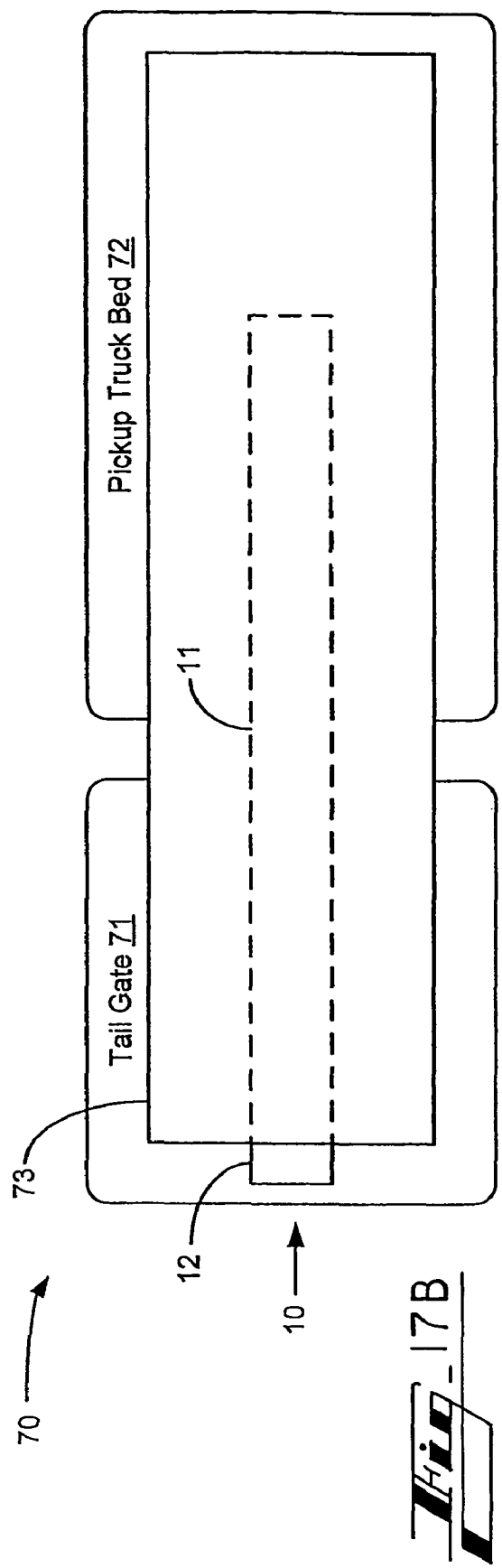

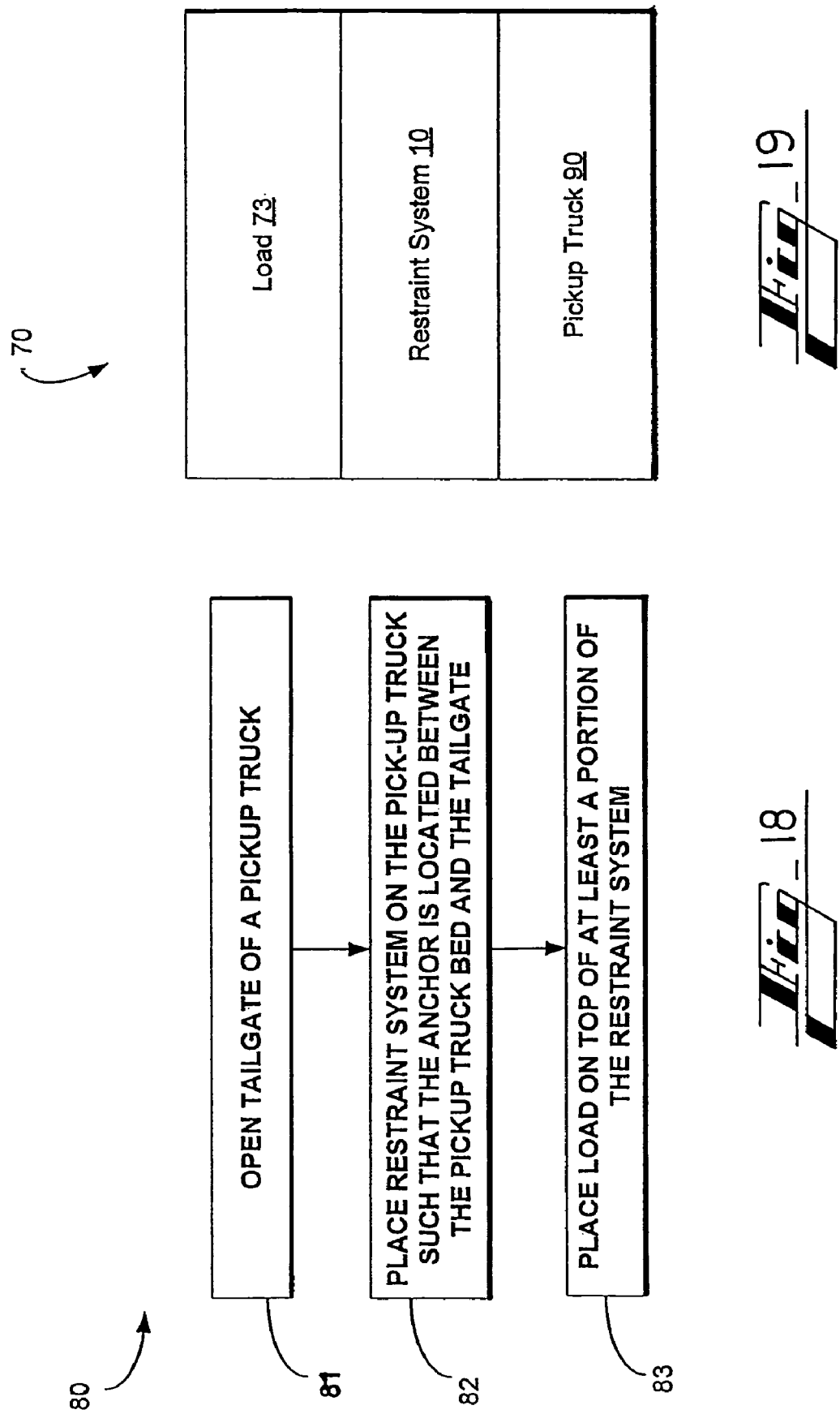

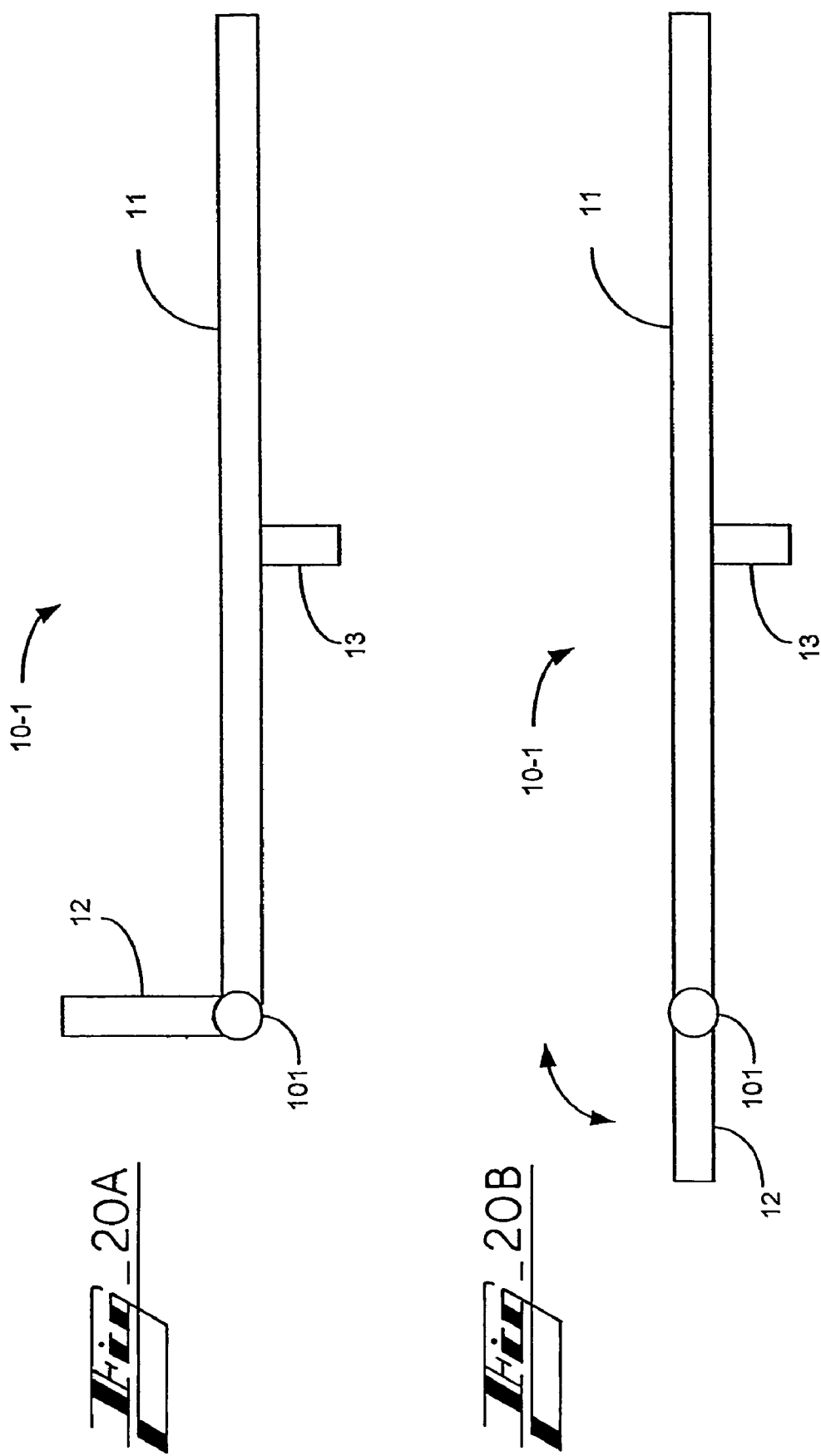

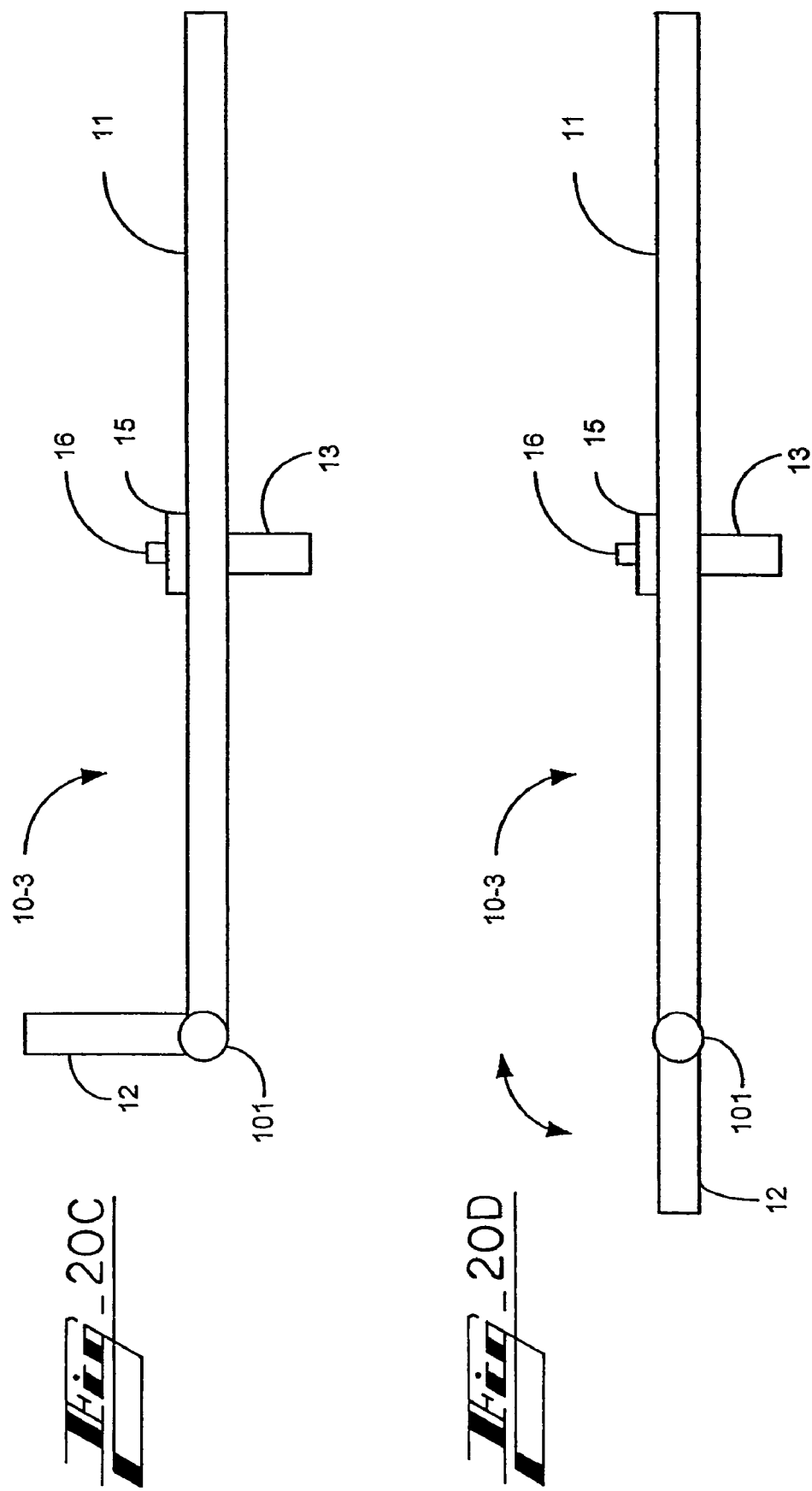

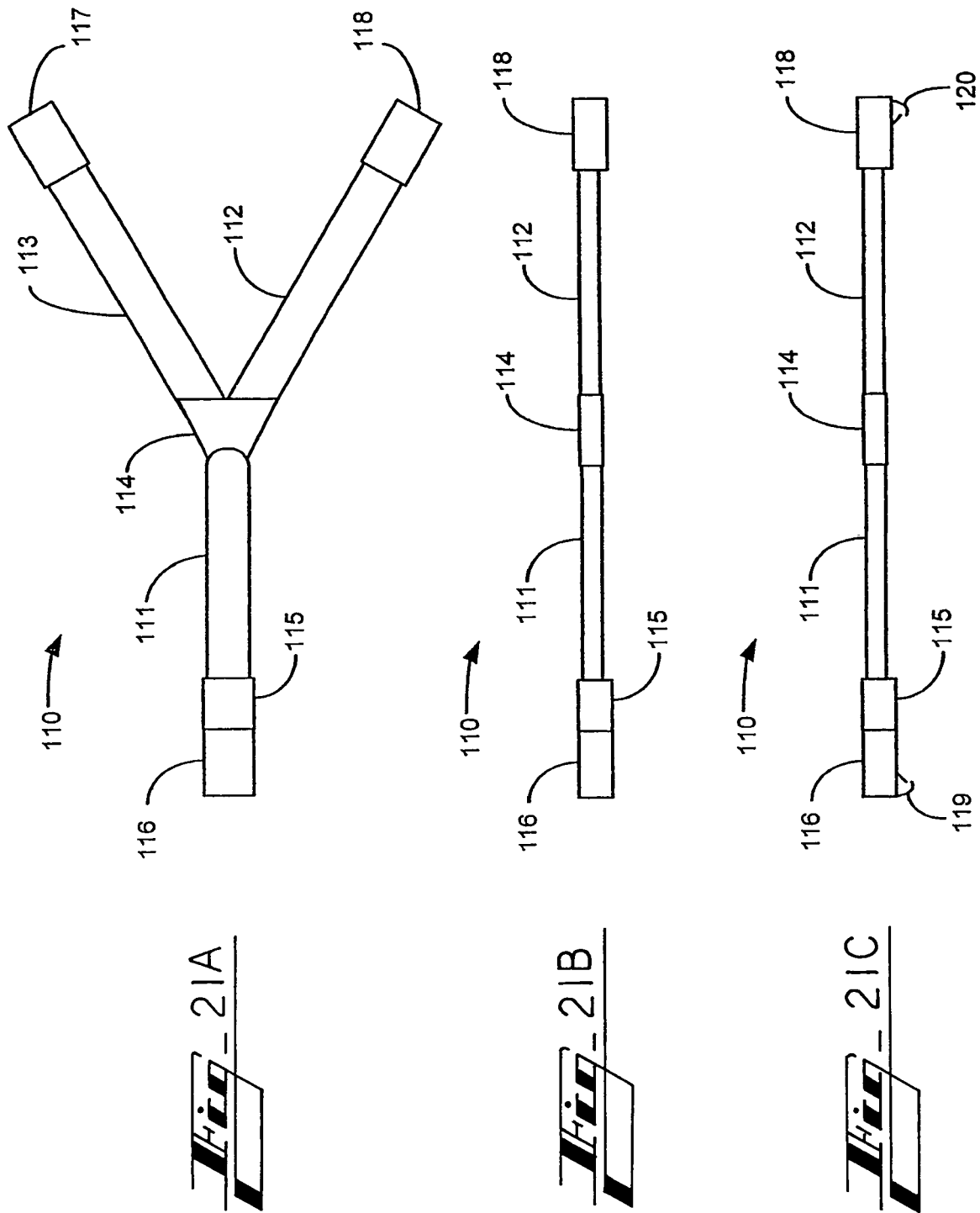

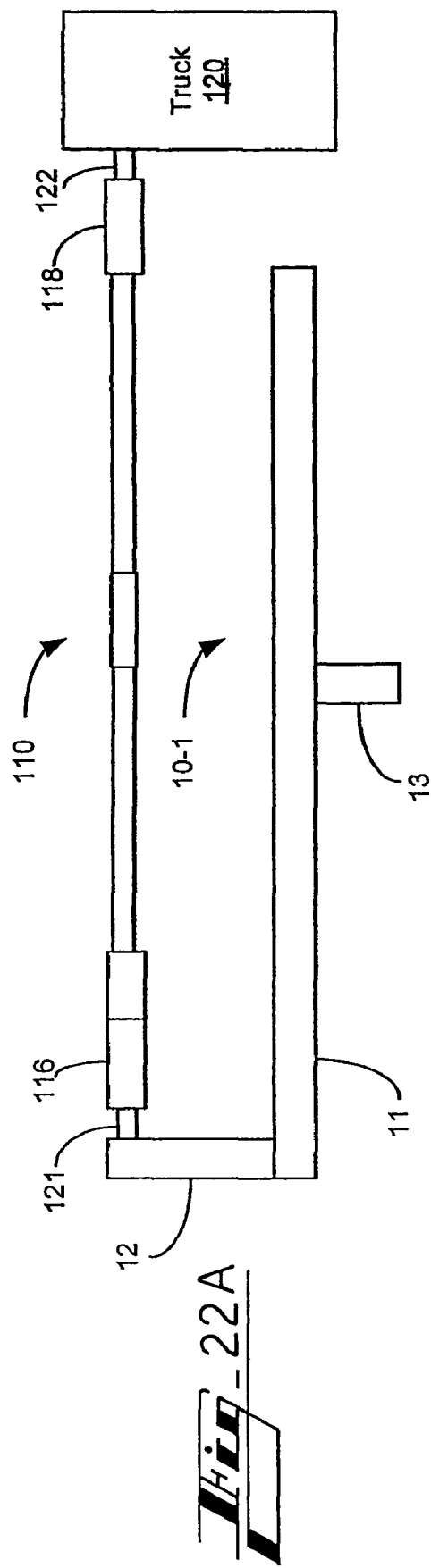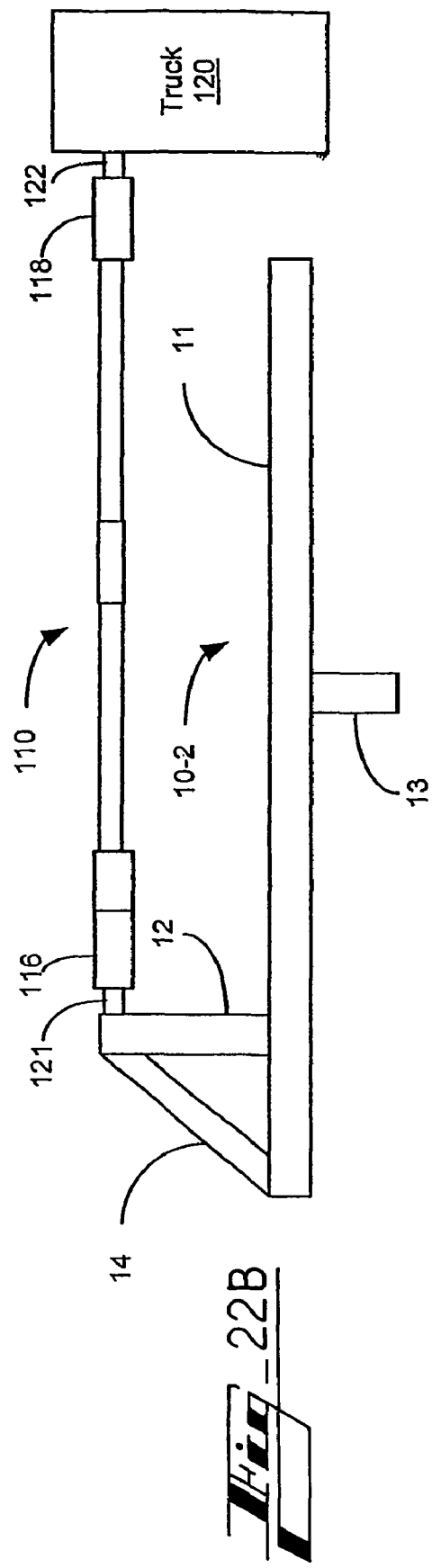
Fig. 22A
Fig. 22B

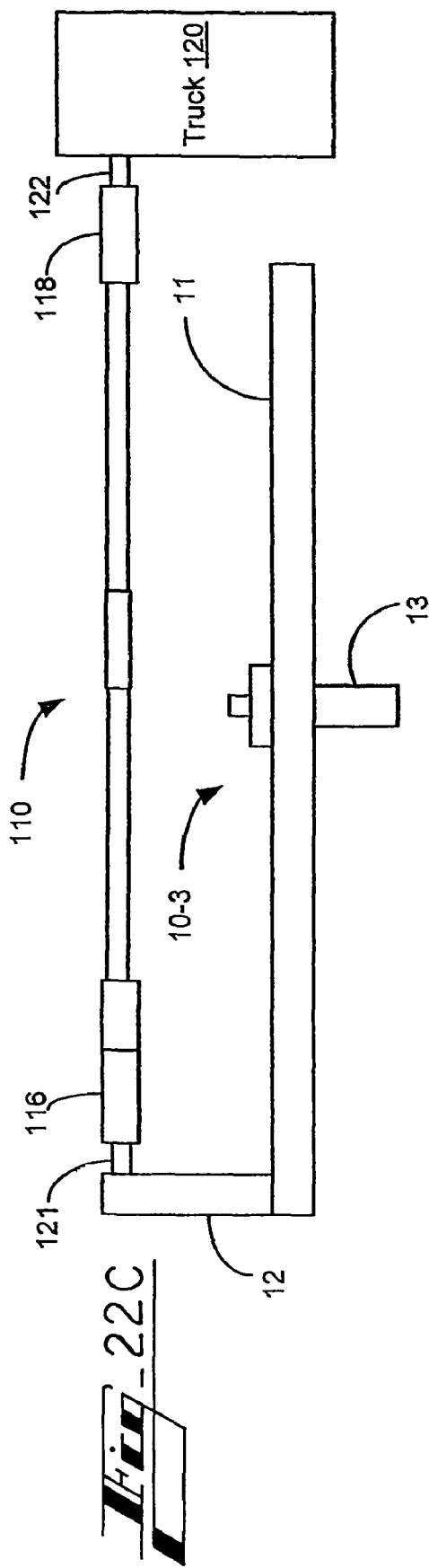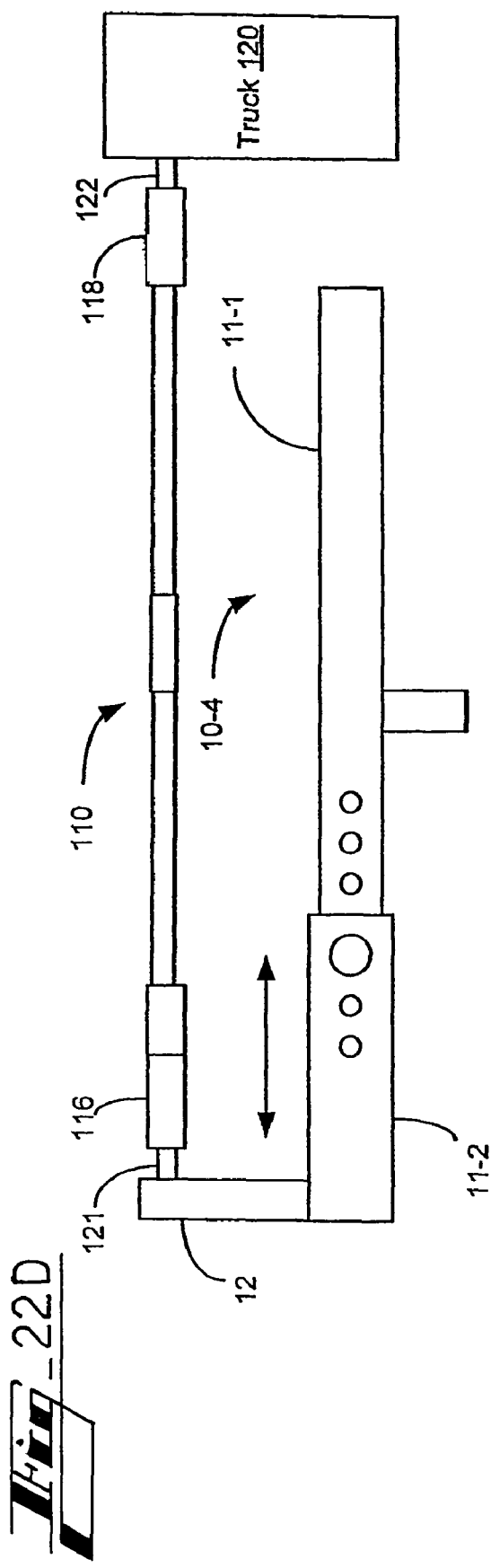
Fig. 22C
Fig. 22D

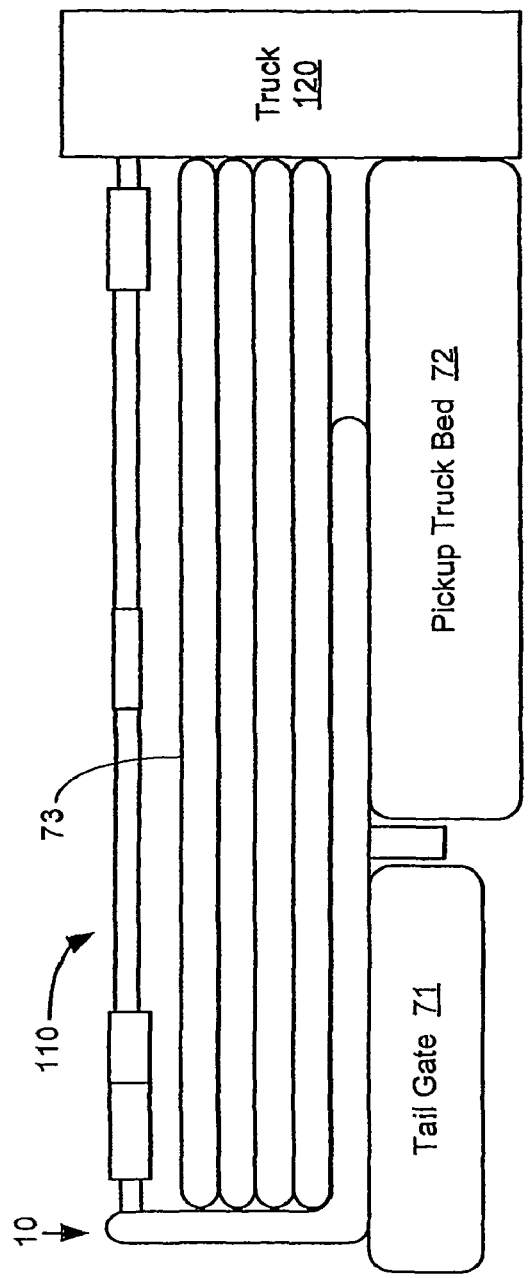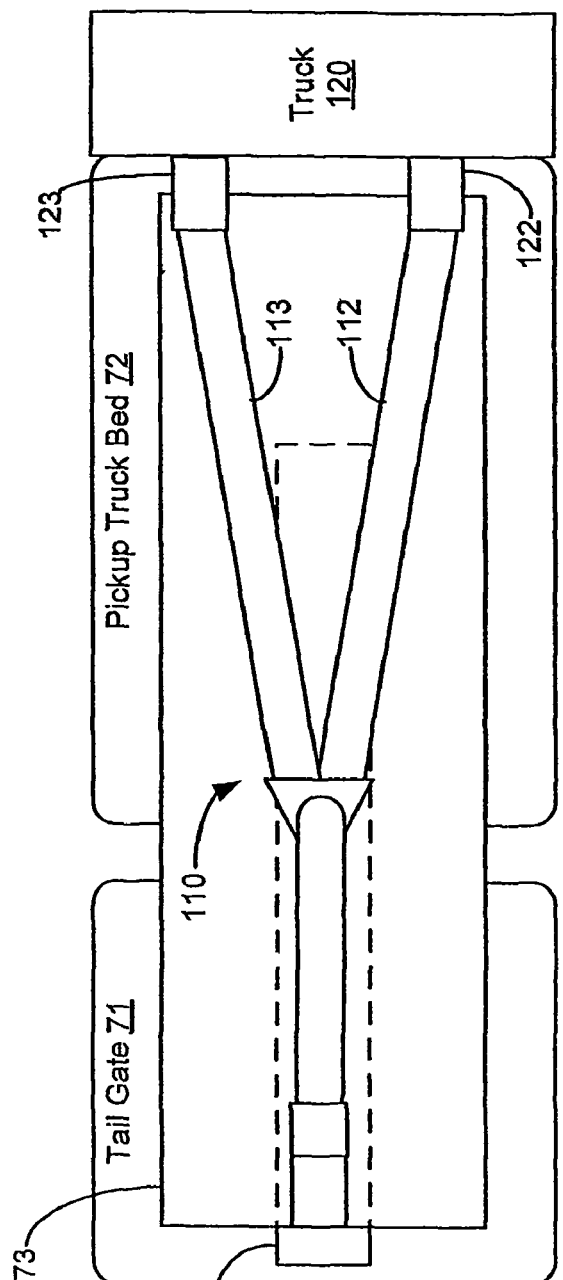

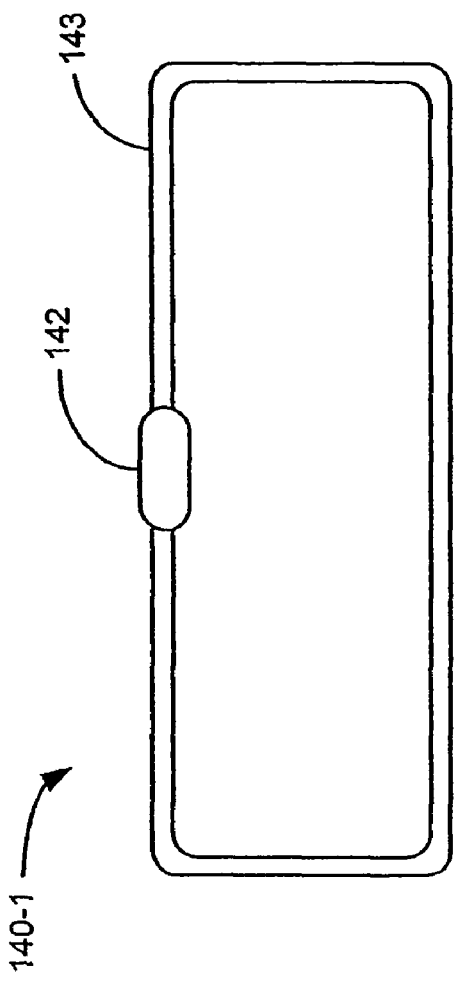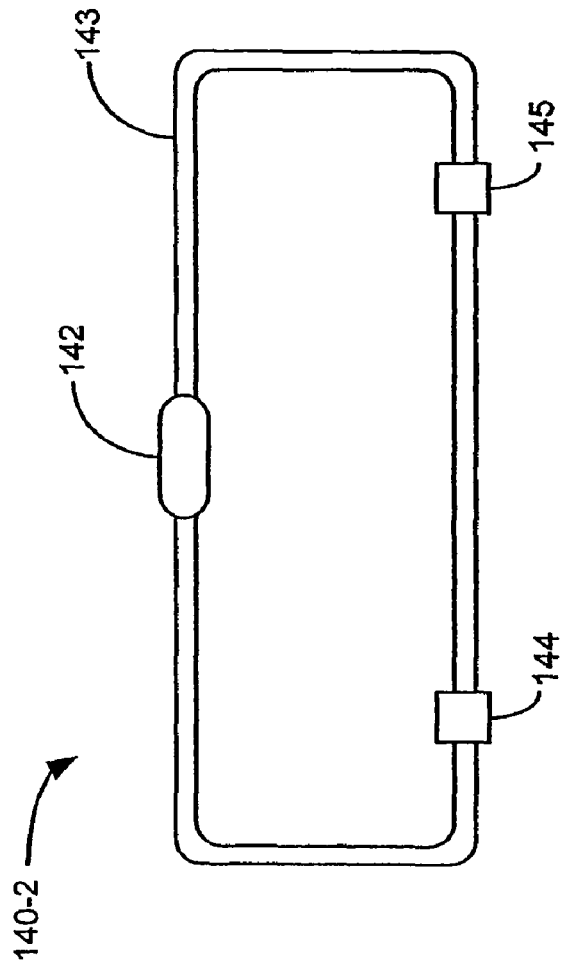
Fig. 24A
Fig. 24B

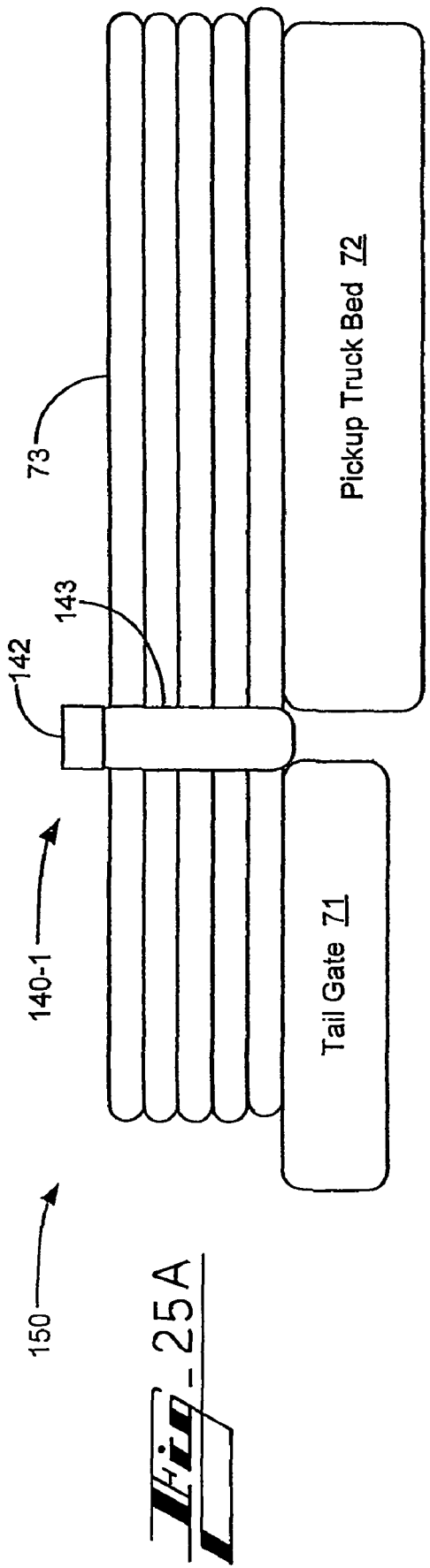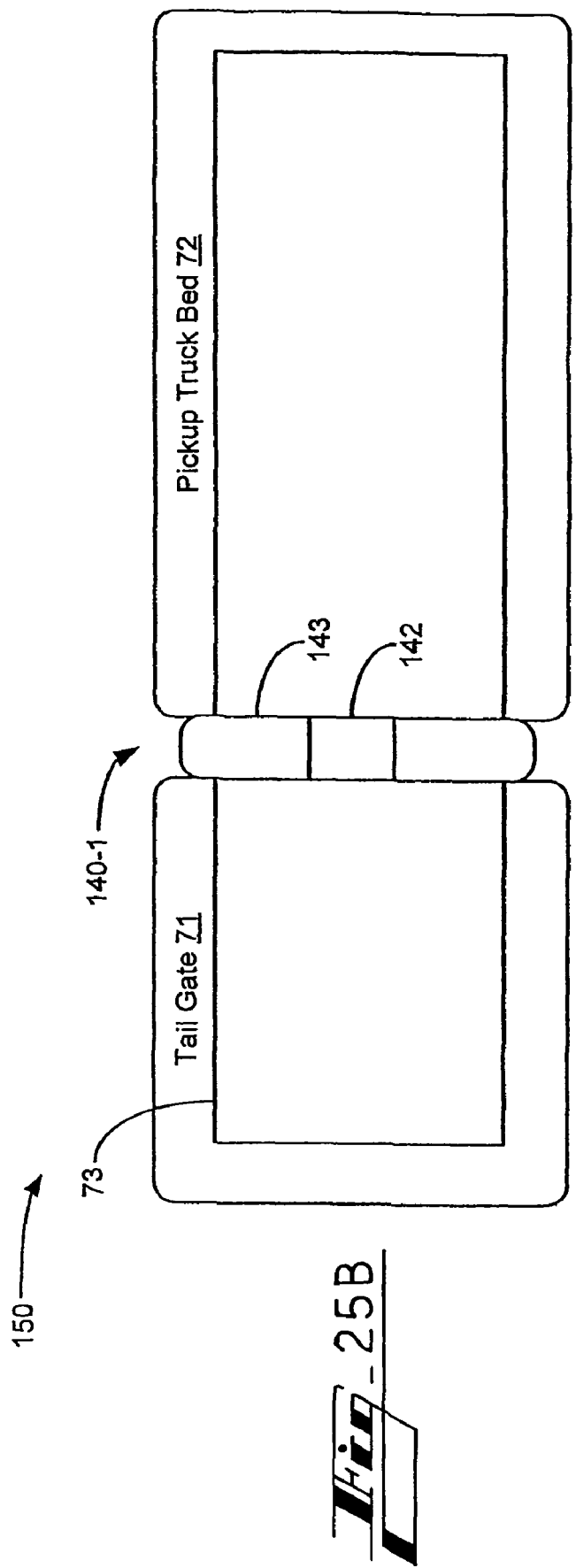
Fig. 25A
Fig. 25B

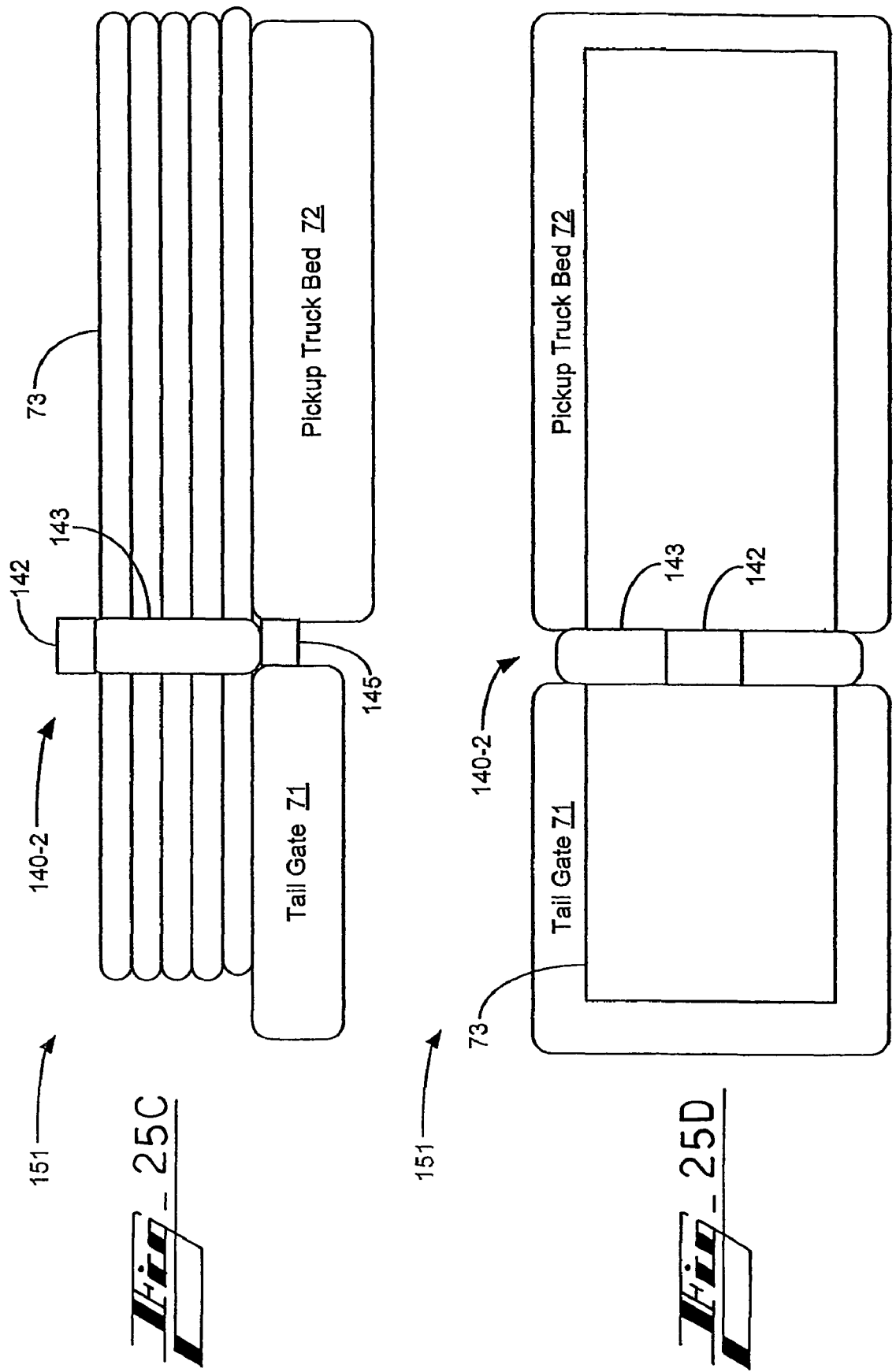

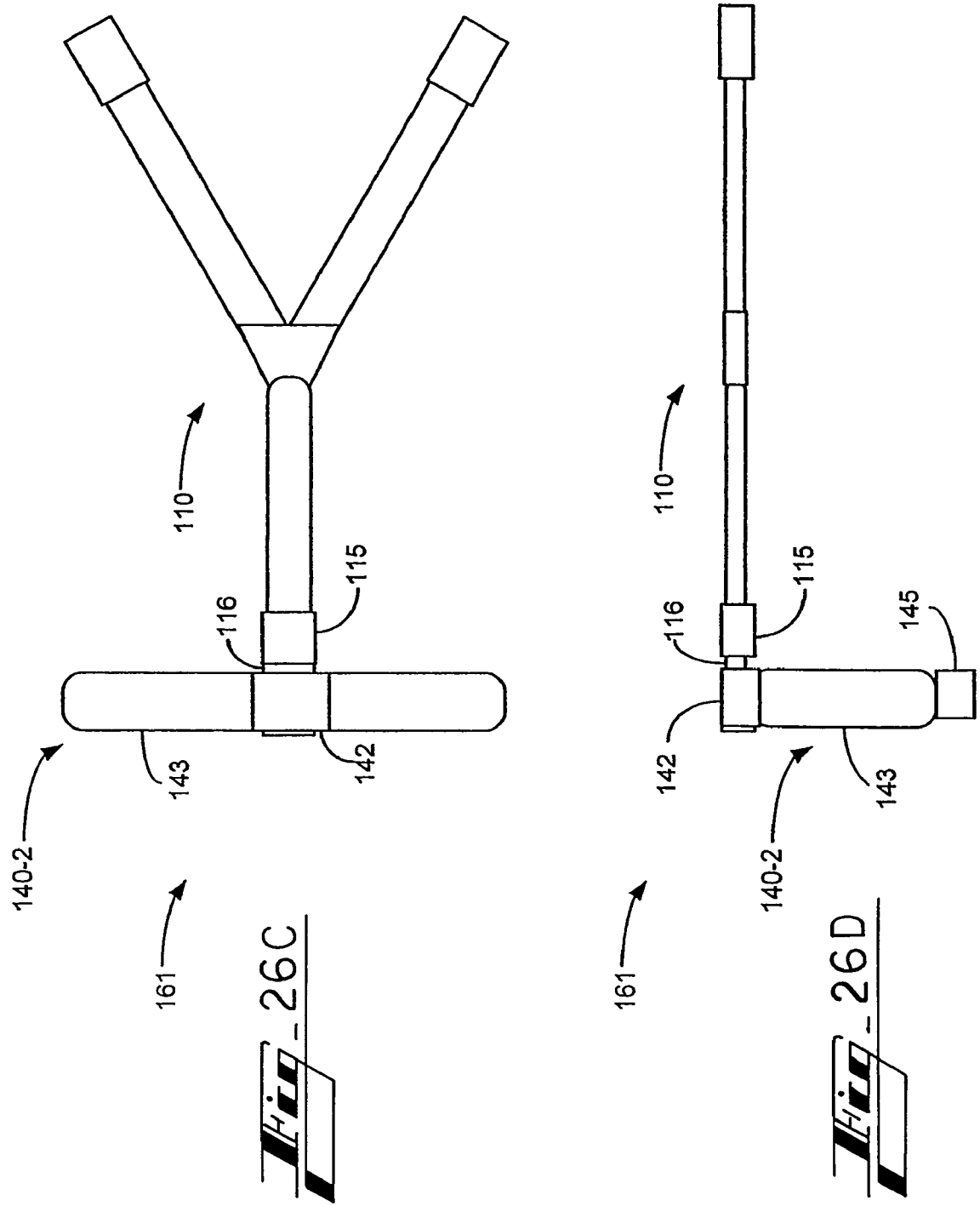

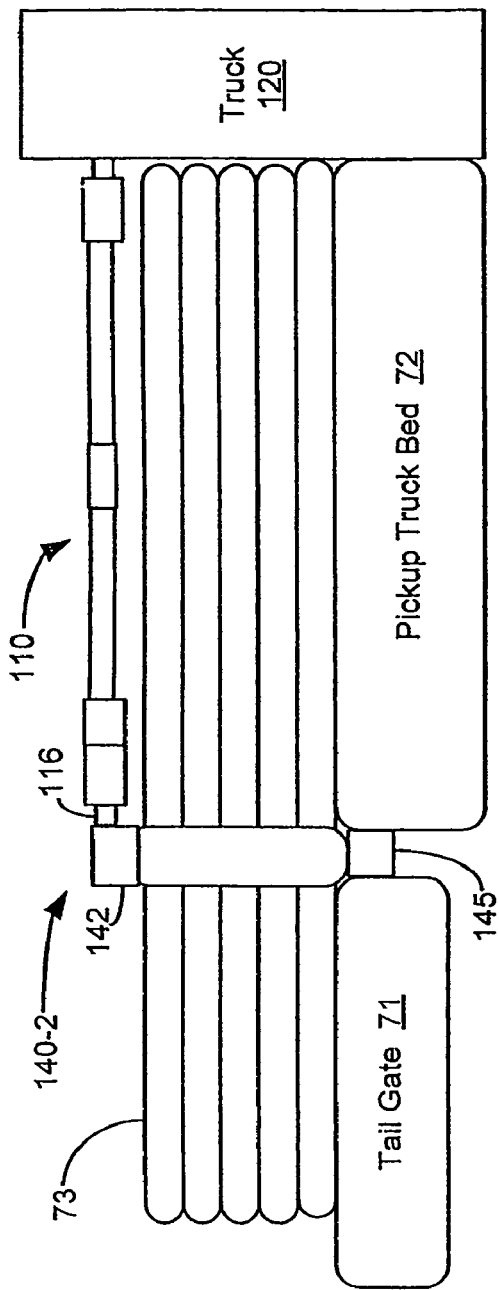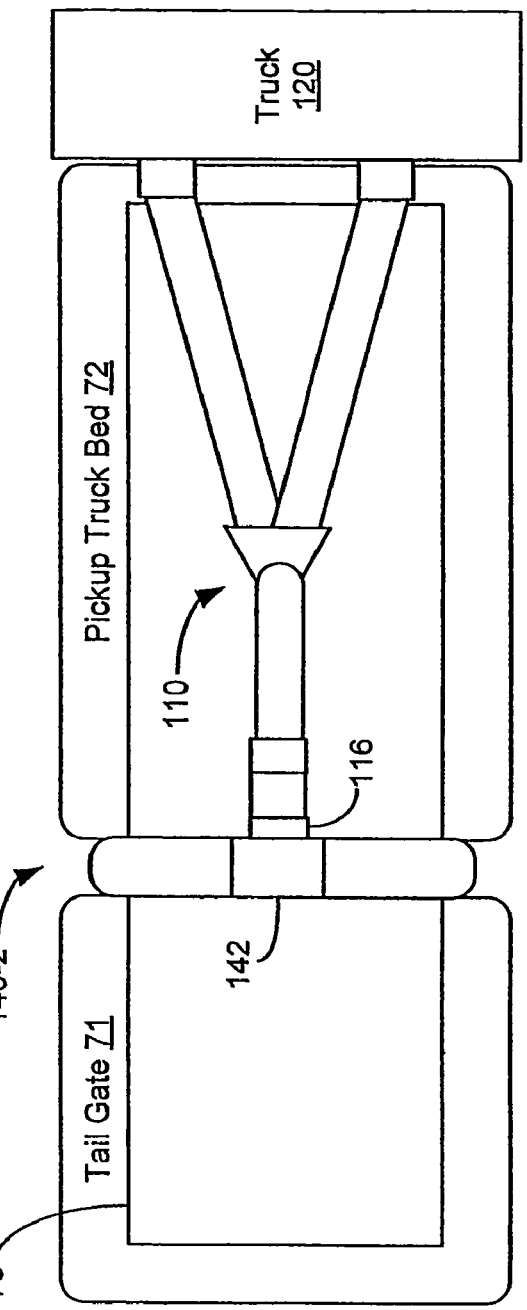

LOAD RESTRAINING APPARATUS, SYSTEM AND METHOD

Priority based on U.S. Provisional Application, Ser. No. 60/661,362, filed Mar. 14, 2005, and entitled, "Load Restraining System", is claimed; and Priority based on U.S. Provisional Application, Ser. No. 60/694,721, filed Jun. 28, 2005, and entitled, "Load Restraining Systems and Methods", is claimed.

BACKGROUND

I. Field of the Invention

The present invention relates generally to the field load restraining systems for trucks, and more particularly, to load restraining apparatuses, systems and methods.

II. Description of the Related Art

Pickup trucks are commonly used to carry large loads in the bed of the pickup truck. Users commonly use several devices and methods in order to secure the load in the bed, most typically by closing the tailgate of the pickup truck to enclose the load within the bed. However, it is appreciated that the tail gate of the pickup truck is often left in an open position because loads often exceed the length of the bed. As such, the users typically employ straps, twine and the like in order to secure the load within the bed. Pickup trucks typically include several attachment points, such as latches, securements, buckles, brackets, clamps, clasps, eyelets, anchors, rings, holes, slots, or the like, that enable to user to secure the load by tying, for example, twine between the attachment points and the load. This process is often cumbersome and inefficient because the twine or strap can ultimately contain slack that manifests itself only after the load has been secured and the pickup truck moved. In addition, the use of twine, straps and the like does not provide a predictable method of tying the load to the bed. Vibration, turning, jostling, acceleration, and deceleration of the vehicle during transit may result in further unpredictable cargo movement and adverse consequences.

Accordingly, there persists a need for an apparatus, system and method for predictable and efficient load restraint to a bed of a pickup truck.

SUMMARY

In general, the invention features apparatuses, systems and methods for restraint of loads to the bed of a pickup truck.

An embodiment of a load restraining system is configured to restrain a load in a pickup truck. The load restraining system comprises a base, a load restraining component, and an anchor. The anchor is configured to anchor the load restraining system to a pickup truck. The load restraining component is configured to prevent cargo from falling out of the pickup truck. The base is connected to the load restraining component and to the anchor.

An embodiment of a load restraining method includes: opening a tailgate of a pickup truck; placing a restraint system on the pick-up truck such that an anchor of the restraint system is located between the pickup truck bed and the tailgate; and placing a load on top of at least a portion of the restraint system such that the load is restrained by a load restraining component of the restraint system.

In general, in one aspect, the invention features a load restraining apparatus, including an elongated base, a load restraining component disposed along the elongated base, and an anchor connected to the base.

In one implementation, the load restraining component is positioned on an end of the elongated base on an upper surface of the base.

In another implementation, the apparatus further includes a through-slot oriented on the load restraining component.

In another implementation, the anchor is positioned along the base on a bottom surface of the base.

In another implementation, the apparatus further includes a plurality of slots disposed along the elongated base.

In another implementation, the anchor is coupled to one of the plurality of slots.

In another aspect, the invention features a load restraining apparatus, including a first strap block, a second strap block positioned adjacent the first strap block, an elongated strap having a first end fixedly connected to a ratchet and a second end wrapped on the ratchet, wherein the strap is threaded through a slot on each of the first and second strap blocks.

In one implementation, each of the first and second strap blocks include a block base, a top plate disposed on the block base and an outer lip disposed on an upper surface of the top plate.

In one implementation, the slot on each of the first and second strap blocks is located through the block base.

In another implementation, the top plate tapers from the lip to an opposite end of the top plate.

In another implementation, the first and second strap blocks are disposed on the elongated strap in opposition to one another.

In another implementation, the first and second strap blocks are moveable along the elongated strap.

In another aspect, the invention features a load restraining apparatus, including a mounting plate, a first ratchet disposed on a surface of the mounting plate, a second ratchet disposed on the surface of the mounting plate, a first strap connected to the first ratchet, a second strap connected to the second ratchet, a strap coupler connected to an end of the second strap and a strap set connected to the strap coupler.

In one implementation, the first and second ratchets are disposed on the mounting plate in an orthogonal orientation.

In another implementation, the first strap is generally orthogonal the second strap.

In another implementation, the second strap and the strap set form a Y-configuration.

In another implementation, the strap set includes a third strap connected to the strap coupler and a fourth strap connected to the strap coupler.

In another implementation, the apparatus further includes a connector connected to each of the third and fourth straps.

In another implementation, the apparatus further includes a flag mount disposed on the mounting plate.

In another aspect, the invention features a load restraining system, including at least one strap, at least one ratchet connected to the at least one strap and means for restraining a load in a pickup truck bed, the means for restraining disposed along a portion of the at least one strap.

One advantage of the invention is that a load in a pickup truck can be retained in the bed of the pickup truck.

Another advantage of the invention is that the load is retained by increasing frictional force between the load and the pickup truck bed.

Another advantage of the invention is that the load can be restrained in a pickup truck bed in a predetermined pattern, arrangement, and configuration.

Another advantage of the invention is that it utilizes existing open tailgate configurations to restrain a load in the pickup truck bed.

Another advantage of the invention is that it utilizes existing latches in a pickup truck bed to restrain a load.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the claims (currently or subsequently presented).

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 1 illustrates a perspective view of an embodiment of a load restraining apparatus;

FIG. 2 illustrates a side view of an embodiment of a load restraining apparatus;

FIG. 3 illustrates a top view of an embodiment of a load restraining apparatus;

FIG. 4 illustrates a bottom perspective view of an embodiment of an anchor for an embodiment of a load restraining apparatus;

FIG. 7 illustrates a perspective view of the embodiment of a load restraining apparatus of FIGS. 1-4 securing a load in a pickup truck bed;

FIG. 8 illustrates a perspective view of the embodiment of a load restraining apparatus of FIG. 5 securing a load in a pickup truck bed;

FIGS. 11A-11D are diagrams depicting a load restraining system that is configured to restrain a load in a pickup truck;

FIGS. 12A-12D are diagrams depicting another load restraining system that is configured to restrain a load in a pickup truck;

FIGS. 13A-13C are diagrams depicting yet another load restraining system that is configured to restrain a load in a pickup truck;

FIGS. 14A-14C are diagrams depicting a further load restraining system that is configured to restrain a load in a pickup truck;

FIGS. 15A-15C are diagrams depicting another load restraining system that is configured to restrain a load in a pickup truck;

FIGS. 16A-16C are diagrams depicting yet another load restraining system that is configured to restrain a load in a pickup truck;

FIGS. 17A-17B are diagrams depicting a load transport system;

FIG. 18 is a method for restraining a load in a pickup truck;

FIG. 19 is a conceptual block diagram of a load transport system;

FIGS. 20A-20D are diagrams depicting the opening and closing of a load restraining component on a hinge;

FIGS. 21A-21C are diagrams of a Y-strap configured to restrain a load in a pickup truck;

FIGS. 22A-22D are diagrams of a Y-strap attached to a load restraining system;

FIGS. 23A-23B are diagrams depicting a load transport system comprising a Y-strap attached to a load restraining system;

FIGS. 24A-24B are diagrams depicting an adjustable gap strap to secure a load;

FIGS. 25A-25D are diagrams depicting a load transport system comprising a gap strap configured to secure a load on a pickup truck bed and a tail gate;

FIGS. 26A-26D are diagrams depicting a Y-strap attached to a gap strap to secure a load; and, FIGS. 27A-27D are diagrams depicting a load transport system comprising a Y-strap attached to a gap strap to secure a load on a pickup truck bed and a tail gate.

DETAILED DESCRIPTION

Figure 5:
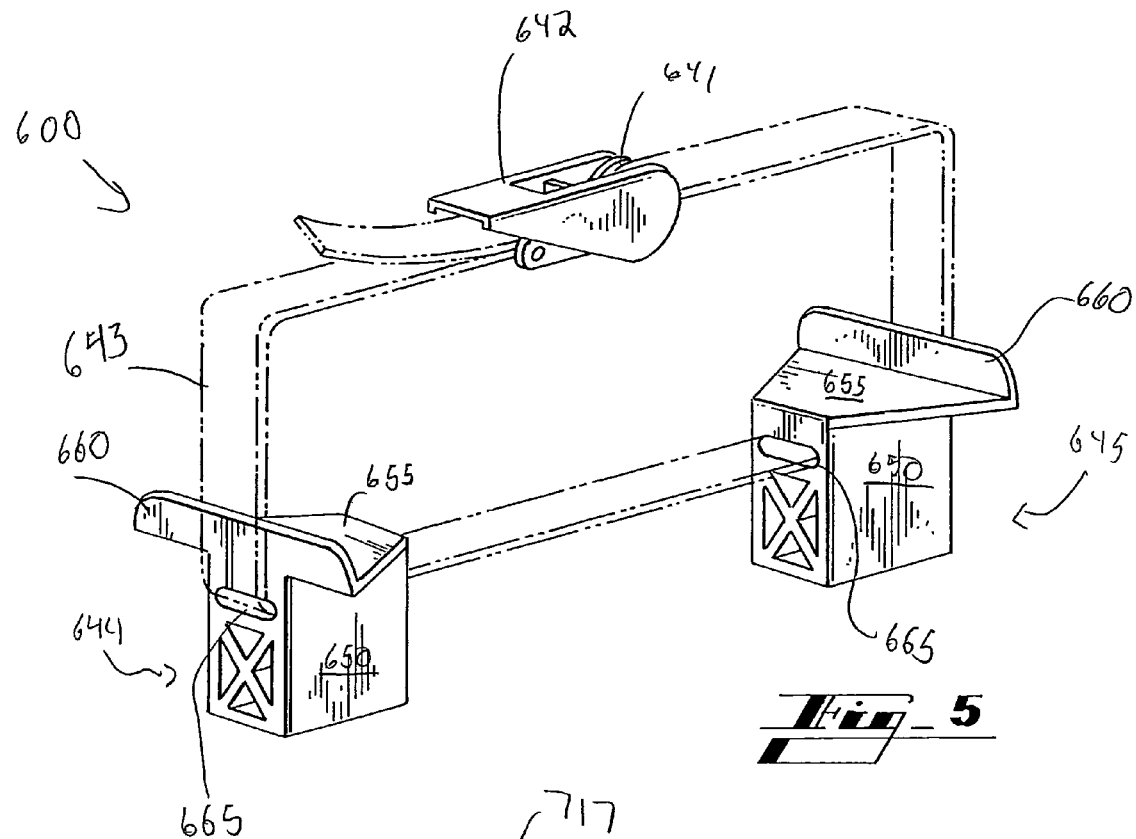
FIG. 5 illustrates a perspective view of an alternate embodiment of a load restraining apparatus.

Referring to the drawings wherein like reference numerals designate corresponding parts throughout the several figures, reference is made first to FIG. 1 that illustrates a perspective view of an embodiment of load restraining apparatus 500, configured to restrain a load in a pickup truck. FIG. 2 illustrates a side view of an embodiment of load restraining apparatus 500 and FIG. 3 illustrates a top view of an embodiment of load restraining apparatus 500.

The load restraining apparatus 500 typically includes base 511, load restraining component 512, and anchor 513. Load restraining component 512 is typically connected to an upper surface of base 511 and anchor 513 is typically connected to a lower surface of base 511. Therefore, as apparatus 500 is positioned in a pickup truck bed as described further below, load restraining component 512 protrudes vertically upward, and anchor 513 protrudes vertically downward. Anchor 513 is configured to anchor load restraining apparatus 500 to a pickup truck, as discussed further in the description below. Load restraining component 512 is configured to prevent cargo from falling out of the pickup truck. In a typical embodiment, load restraining component 512 is connected to one end of base 511 generally perpendicular to base 511, thereby forming a generally L-shape profile. Support component 514 can generally be disposed between base 511 and load restraining component 512, and is typically configured to prevent load restraining component 512 from bending as a result of force applied by a load (e.g., during acceleration of the pickup truck). Base 511, load restraining component 512, and support component 514 can be separate components that are bonded together (e.g., welded). Alternatively, and most typically, base 511, load restraining component 512, and support component 514 are typically a single, integral piece.

In a typical embodiment, anchor 513 is attached to base 511 via wing nut 515, or other suitable nut, and bolt 516. Anchor 513 can be attached to base 511 at different intervals. For example, bolt 516 may be inserted through a hole or, preferably, elongated slot 517 and then fastened via wing nut 515. Anchor 513 can be adjustable over a range of lengths along base 511, typically at discrete intervals, depending on a desired implementation. In this manner, load restraining apparatus 500 enables various length loads (e.g., 8, 9, or 10 feet long) to be restrained in various length pickup truck beds (e.g., 6 or 8 feet long).

As described above, a series of slots 517 are disposed along base 511. Slots 517 can be disposed generally in depression 520 with the perimeters of slots 517 being elevated; thereby, providing generally structural strength and integrity to apparatus 500. Central spline 525 can also be disposed along the length of base 511 to further provide strength and integrity to the apparatus 500. Base 511 can further include angled edge 530, which can aid in positioning apparatus 500 underneath a load, if necessary, as described further below.

As described above, load restraining component 512 typically includes support components 514, which are generally positioned parallel to one another. Load restraining component 512 can further include central support component 535, further adding strength and integrity to apparatus 500. Load restraining component 512 can further include through-slot 540, disposed through the support components and the central support component and being aligned throughout. Through-slot 540 is advantageous to receive a strap if needed to further restrain a load as described further below.

As discussed further in the description below, apparatus 500 can be manufactured using any of a variety of materials, and may comprise dimensions suitable to the intended use.

FIG. 4 illustrates a bottom perspective view of an embodiment of anchor 513 for an embodiment of load restraining apparatus 500 of FIGS. 1-3. Anchor 513 typically includes rear wall 550 connected generally perpendicular with top wall 555 having hole 560 disposed therein to receive bolt 516 as described above. Anchor 513 can further include side arches 565 connected generally perpendicular to rear wall 550 and top wall 555.

FIG. 7 illustrates a perspective view of the embodiment of load restraining apparatus 500 of FIGS. 1-4 securing load 73 in pickup truck bed 72. In general, load restraining apparatus 500 is placed on top of the pickup truck such that anchor 513 is located (at least in part) between pickup truck bed 72 and tailgate 71. Load 73 is placed on top of load restraining apparatus 500 such that it is restrained by restraining component 512. Load 73 may be significantly larger than load restraining apparatus 500 as shown in FIG. 7. Load 73 may comprise, for example, rectangular sheets of building material (e.g., plywood, sheetrock, and/or paneling). It is appreciated that the weight of load 73 provides increasing normal force on load restraining apparatus 500; thereby, increasing the frictional force between base 511 and pickup truck bed 72. The frictional force caused by the weight of load 73 helps to prevent load 73 from pushing against restraining component 512 and out of pickup truck bed 72. However, the presence of anchor 513 prevents virtually all movement of the load from pickup truck bed 72. In general, flat rear wall 550 of anchor 513 pushes against tail gate 71 as a counterforce to load 73 pushing against restraining component 512.

FIG. 5 illustrates a perspective view of an alternate embodiment of load restraining apparatus 600, configured to restrain a load. In a typical embodiment, load restraining apparatus 600 includes elongated strap 643 having ratchet 642. One end of strap 643 is typically fixedly connected to one end of ratchet 642 and the other end of strap 643 is wrapped around take-up roll 641 of ratchet 642. Strap 643 is typically comprised of a material suitable to the application (e.g., nylon, rope, or any other suitable material), and can be of various lengths.

Load restraining apparatus 600 further typically includes first strap block 644, and second d strap block 645, each disposed along strap 643. Ratchet 642 may be used to adjust the length of strap 643 responsive to a load size. First strap block 644 and second strap block 645 each typically include block bases 650 having top plate 655. Top plates 655 each typically include outer lips 660.

Each block base 650 further typically includes through-slots 665, through which strap 643 is typically threaded. As discussed further in the description below, first strap block 644 and second strap block 645 are placed in a pickup truck in the gap defined between the pickup truck bed and the tailgate to allow load restraining system 600 to be used to secure a load without the use of external attachments. In a typical implementation, first strap block 644 and second strap block 645 are placed in opposition to one another within the gap as defined above such that outer lips 660 are positioned on the outer edges of a load to generally prevent side-to-side (lateral) movement of the load. Strap blocks 644, 645 are moveable along strap 643 for placement at a desired location to accommodate different load sizes.

In one embodiment, top plates 655 can be tapered from the innermost portion of top plate 655 to the outermost portion of top plate having the outer lip 660. The taper provides a larger outer surface to accommodate outer lips 660. Furthermore, through-slots 665 provide a conduit for strap 643 such that strap 643 can be wrapped around the entire load without the weight of the load being put atop strap 643. In this way, strap 643 can be tightened by ratchet 642 without frictional forces from the load as described further below.

FIG. 8 illustrates a perspective view of the embodiment of load restraining apparatus 600 of FIG. 5 securing load 73 on pickup truck bed 72 and tailgate 71. In general, strap 643 is connected and wrapped around load 73 and ratchet 642 adjusts strap 643 to a length responsive to load 73 size. Strap blocks 644, 645 are placed in the gap defined between pickup truck bed 72 and tailgate 71 with the load placed atop top plates 655. Strap blocks 644, 645 can be adjusted such that outer lips 660 are pressed against load 73. Therefore, as ratchet 642 is tightened, lips 660 are pressed against load 73 and, therefore, further secured against load 73. The weight of load 73 continues to provide a downward force against top plates 655 and, therefore, strap blocks 644, 645 remain wedged in between the gap as described. With increasing force applied by strap 643 around load 73 as ratchet 642 is tightened, load 73 experiences a greater frictional force against strap 643 and is, therefore, retained in pickup truck bed 72.

Figure 6:
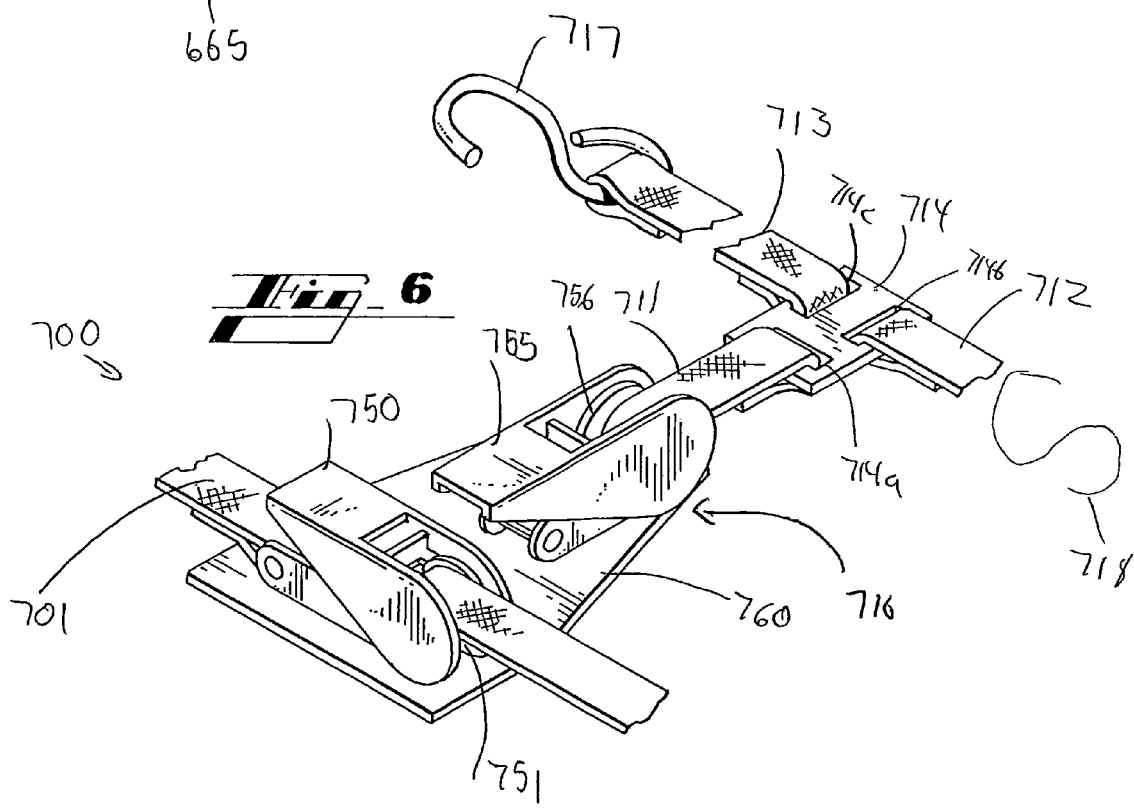
FIG. 6 illustrates a perspective view of still another alternate embodiment of a load restraining apparatus.

FIG. 6 illustrates a perspective view of still another alternate embodiment of load restraining apparatus 700, configured to restrain a load. Load restraining apparatus 700 typically includes connector assembly 716, which in a typical embodiment, includes first ratchet 750 and second ratchet 755, first and second ratchets 750, 755 being generally mounted to mounting plate 760. In a typical implementation, first and second ratchets 750, 755 are disposed orthogonally to one another atop mounting plate 760. First strap 701 is typically threaded around a load as described further below and connected to first ratchet 750. In general, one end of first strap 701 is fixedly connected to first ratchet 750 and the other end of the strap is wrapped on take-up roll 751 of first ratchet 750.

Second strap 711 is connected between second ratchet 755 and strap coupler 714. Typically, one end of second strap 711 is fixedly connected to first slot 714a on strap coupler 714 and the other end of second strap 711 is wrapped on take-up roll 756 of second ratchet 755. One end of third strap 712 is connected to strap coupler 714, typically via second slot 714b, the second end of third strap 712 typically connected to connector 718. One end of fourth strap 713 is connected to strap coupler 714, typically via second slot 714c, the second end of fourth strap 713 typically connected to connector 717. In one embodiment, connectors 717, 718 are S-connectors as illustrated in FIG. 6. Connectors 717, 718 can also be hooks, latches, or any other suitable device to attach straps 712, 713 to a pickup truck bed or cab. Straps 701, 711, 712, 713 typically, but are not required to, comprise the same material (e.g., nylon, rope, or any other suitable material), and they may be various lengths. Although strap coupler 714 is typically a rigid material such as metal, it can also comprise the same material as straps 701, 711, 712, 713 or any other suitable material interconnected, for example, via sewn joints. Regardless of the material, strap coupler 714 couples strap 711 to straps 712, 713 to generally form a Y-configuration. In general, as described further below, first ratchet 750 is used to tighten first strap 701 generally around a load. The Y-configuration of straps 711, 712, 713 can be tightened along the same load by adjusting orthogonally arranged second ratchet 755. It is appreciated that the second strap tightens in a direction orthogonal to the tightening direction of first strap 701. Third and fourth straps 712, 713 typically tighten at a non-orthogonal angle to first or second straps 701, 711.

Figure 9:
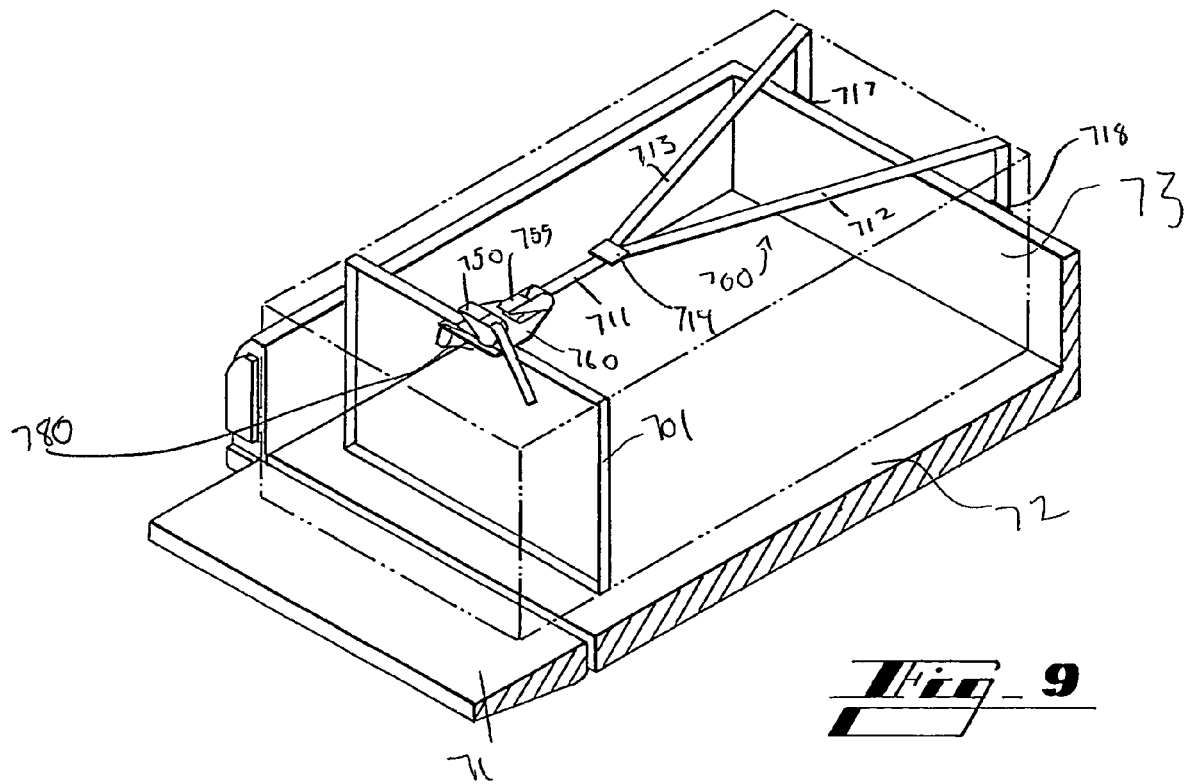
FIG. 9 illustrates a perspective view of the embodiment of a load restraining apparatus of FIG. 6 securing a load in a pickup truck bed.

FIG. 9 illustrates a perspective view of the embodiment of load restraining apparatus 700 of FIG. 6 securing load 73 in a pickup truck bed 72. In general, load restraining apparatus 700 is placed on load 73, which is on pickup truck bed 72 and on tail gate 71. Load 73 may comprise, for example, rectangular sheets of building material (e.g., plywood, sheetrock, and/or paneling). Typically, mounting plate 760 is placed atop load 73 and first strap 701 is wrapped around load 73. Third and fourth straps 712, 713 are generally connected to pickup truck bed 72, typically to the loops and latches provided in pickup truck bed 72. Ratchets 750, 755 are then tightened to secure load 73. As it is understood that the connection of straps 701, 712, 713 and the subsequent tightening of the straps by ratchets 750, 755 can be performed in any desirable order, the order described is only illustrative. In general, as first ratchet 750 is tightened, first strap 701 is secured around load 73. As second ratchet 755 is tightened, second strap 711 is tightened along the load orthogonal to the tightening of first strap 701. Second strap 711 further provides tension in third and fourth straps 712, 713, providing tightening of straps 712, 713 at a non-orthogonal angle to the tightening of first and second straps 701, 711.

FIG. 9 further illustrates that apparatus 700 can further include flag holder 780 into which a flag can be inserted, so as to alert drivers on the road that an extended load is present in pickup truck bed 72.

Figure 10:
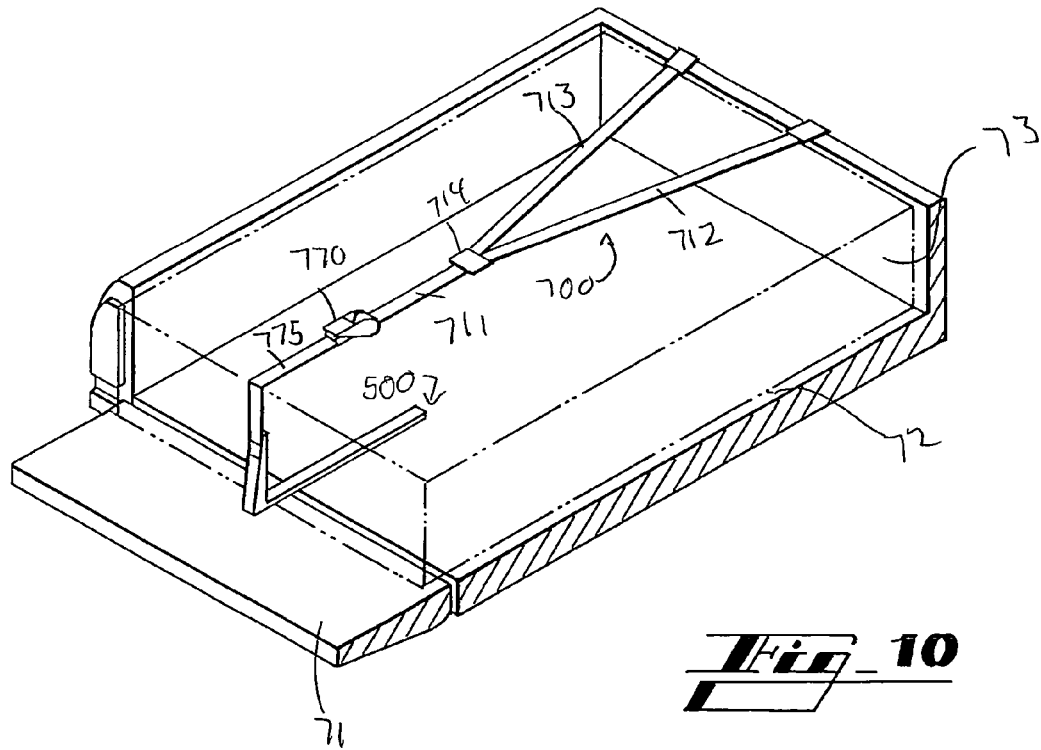
FIG. 10 illustrates an embodiment of a load restraining system securing a load in a pickup truck bed.

FIG. 10 illustrates an embodiment of a load restraining system, typically including load restraining apparatus 500 as described in FIGS. 1-4, and a modified version of load restraining apparatus 700 as described in FIG. 6, securing load 73 in pickup truck bed 72. In general, apparatus 500 is as described with respect to FIGS. 1-4. Apparatus 700 is illustrated as having mounting plate 760 and ratchets 750, 755 removed. A single ratchet can be fixedly connected to additional strap 775 that is connected to apparatus 500. Strap 711 can remain connected to strap coupler 714 connected to straps 712, 713. The other end of strap 711 can be wrapped on ratchet 770.

FIG. 10 illustrates that the embodiments of the load restraining apparatuses as described above can be used in conjunction with the various embodiments and otherwise modified to form various load restraining systems. The remaining figures illustrate further embodiments of load restraining apparatuses and systems, as well as methods of use of those apparatuses and systems.

Figure 11D:
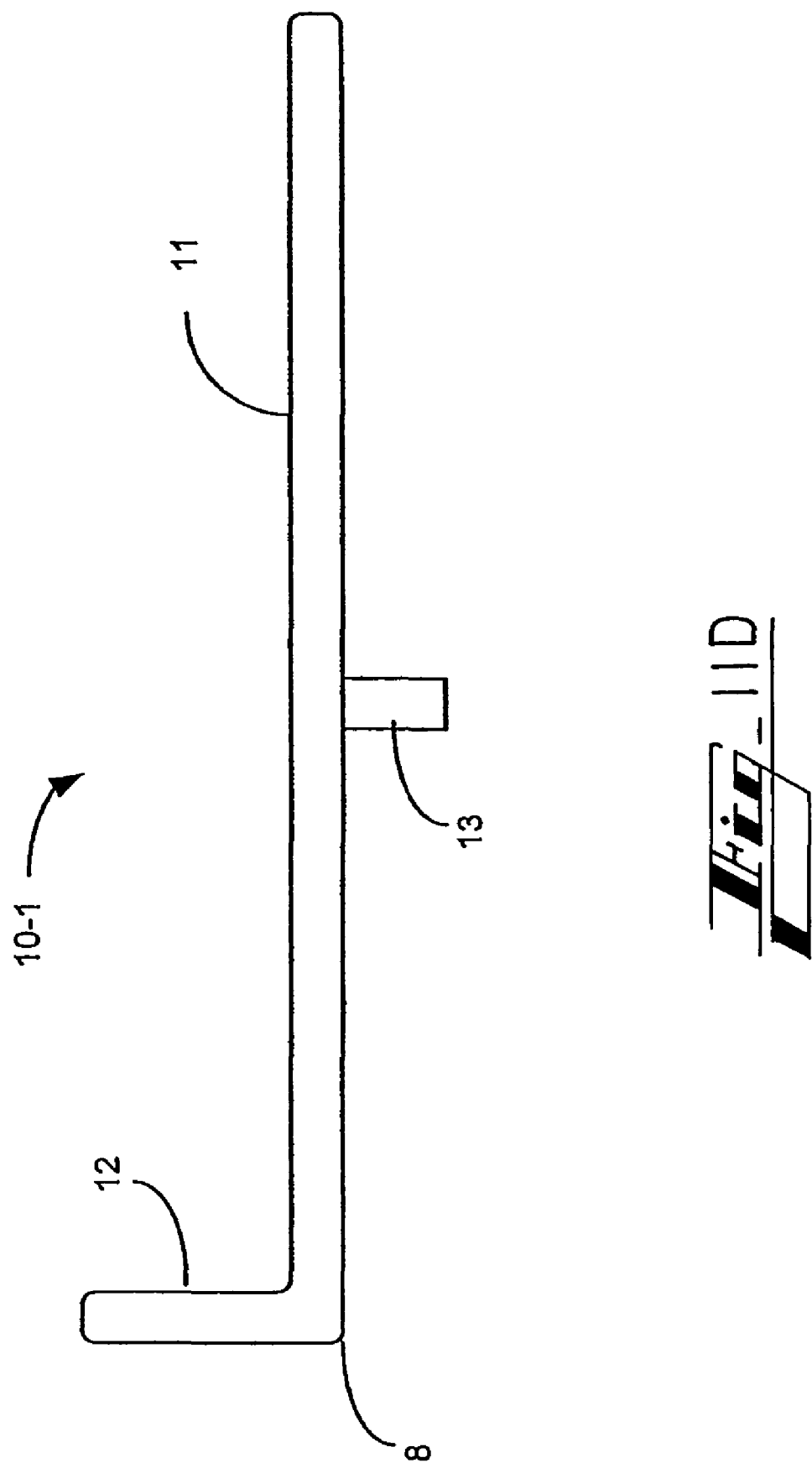

FIGS. 11A-11C are diagrams depicting load restraining system 10-1 that is configured to restrain a load in a pickup truck. Load restraining system 10-1 comprises base 11, load restraining component 12, and anchor 13. Anchor 13 is configured to anchor load restraining system 10-1 to a pickup truck. Load restraining component 12 is configured to prevent cargo from falling out of the pickup truck. Base 11 is connected to load restraining component 12 and to anchor 13. In one embodiment of the invention, base 11, load restraining component 12, and anchor 13 comprise a metal (e.g., iron or aluminum, among others). However, other materials may also be used, depending on a desired implementation, such as, but not limited to, plastics and polypropylene. Base 11 and load restraining component 12 may be part of a single component that is bent at location 8, as shown in FIG. 11D.

Base 11, restraining component 12, and anchor 13 may each be, for example, 1.5 inches wide and 0.25 inches thick, or may have different widths or thicknesses, depending on a desired implementation. Base 11 may be, for example, about 3 feet long, or may have a different length (e.g., shorter or longer), depending on a desired implementation. Restraining component 12 may be, for example, 8 inches long, or may have a different length (e.g., shorter or longer), depending on a desired implementation. Anchor 13 may be, for example, 2.5 inches long, or may have a different length (e.g., shorter or longer), depending on a desired implementation. Many different dimensions may alternatively be used.

FIGS. 12A-12C are diagrams depicting load restraining system 10-2 that is configured to restrain a load in a pickup truck. Load restraining system 10-2 comprises base 11, load restraining component 12, and anchor 13. Anchor 13 is configured to anchor load restraining system 10-2 to a pickup truck. Load restraining component 12 is configured to prevent cargo from falling out of the pickup truck. Base 11 is connected to load restraining component 12 and to anchor 13.

Figure 12D:
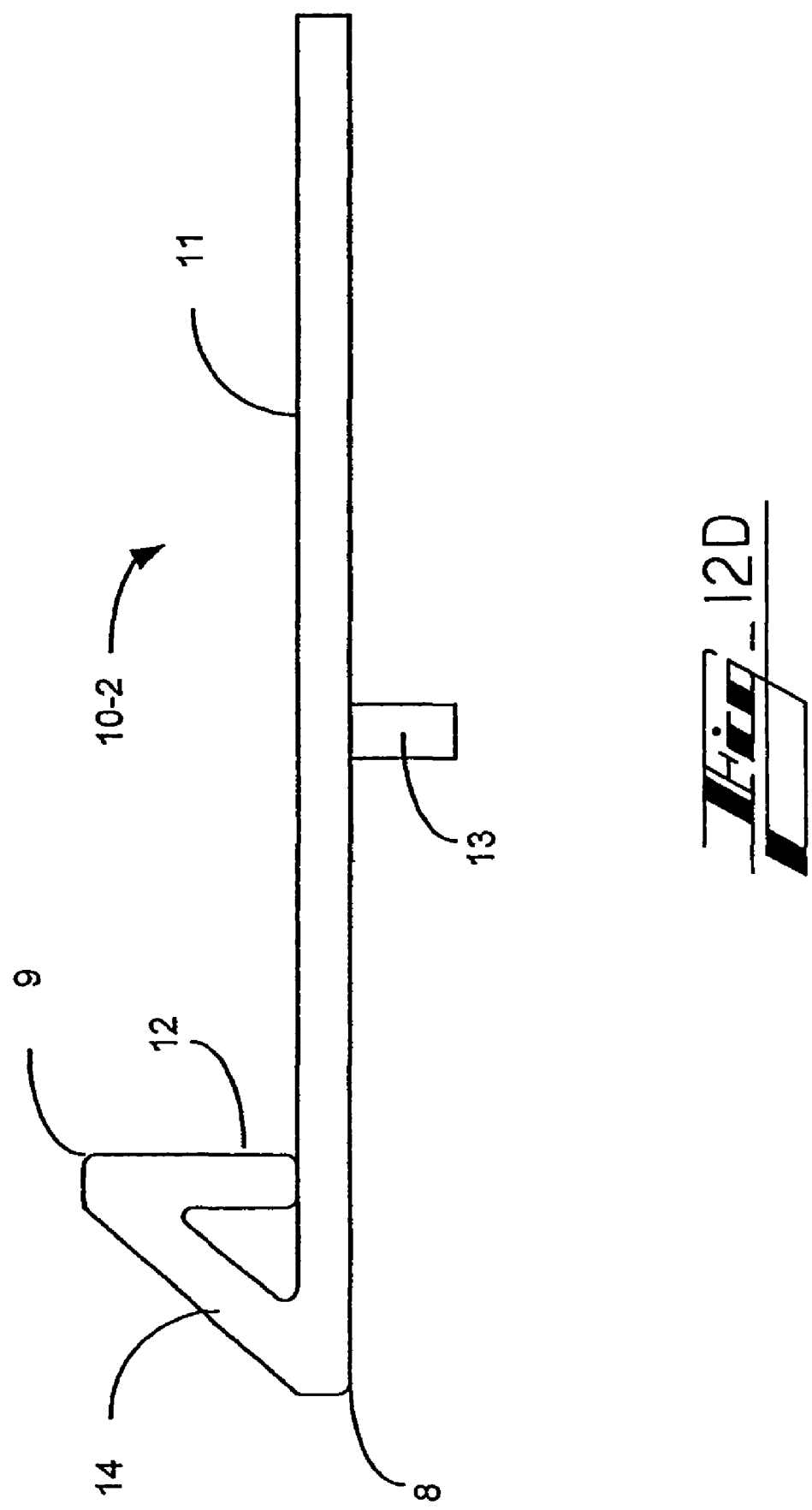

Support component 14 is attached to base 11 and load restraining component 12 and is configured to prevent load restraining component 12 from bending as a result of force applied by a load (e.g., during acceleration of the pickup truck). Base 11, load restraining component 12, and support component 14 may be separate components that are bonded together (e.g., welded). Alternatively, base 11, load restraining component 12, and support component 14 may be part of a single component that is bent at locations 8 and 9, as shown in FIG. 12D.

FIGS. 13A-13C are diagrams depicting load restraining system 10-3 that is configured to restrain a load in a pickup truck. Anchor 13 is attached to base 11 via wing nut 15 and bolt 16. Anchor 13 may be attached to base 11 at different intervals. For example, bolt 16 may be inserted through hole 17 and then fastened via wing nut 15. Anchor 13 may be adjustable over a range of, for example, about two feet along base 11, among other ranges (e.g., smaller or greater), depending on a desired implementation. In this manner, restraining system 10-3 enables various length loads (e.g., 8, 9, or 10 feet long) to be restrained in various length pickup truck beds (e.g., 6 or 8 feet long).

FIGS. 14A-14C are diagrams depicting load restraining system 10-4 that is configured to restrain a load in a pickup truck. Base 11 comprises bases 11-1 and 11-2. Base 11-1 may be partially inserted into base 11-2. Bases 11-1 and 11-2 include holes 19. Base 11-1 may be inserted into base 11-2 (or vice versa, depending on a desired implementation). Bolt 18 may be inserted into hole 19 to attach base 11-1 to base 11-2. A nut (e.g., a wing nut) may be attached to bolt 18 to keep bolt 18 securely fastened to bases 11-1 and 11-2. Restraining component 12 may be adjustable over a range of, for example, about two feet along base 11, among other ranges (e.g., smaller or greater), depending on a desired implementation. In this manner, restraining system 10-4 enables various length loads (e.g., 8, 9, or 10 feet long) to be restrained in various length pickup truck beds (e.g., 6 or 8 feet long).

FIGS. 15A-15C are diagrams depicting load restraining system 10-5 that is configured to restrain a load in a pickup truck. Load restraining system 10-5 comprises base 11, load restraining component 12, and anchor 13. Anchor 13 is configured to anchor load restraining system 10-5 to a pickup truck. Load restraining component 12 is configured to prevent cargo from falling out of the pickup truck. Base 11 is connected to load restraining component 12 and to anchor 13. Restraining component 12 may be repositioned along base 11 so that load restraining system 10-5 may accommodate different size loads and pickup trucks. Restraining component 12 may be inserted (e.g., screwed) into hole 25 (located in base 11) that corresponds to the desired load measurement. Restraining component 12 may be adjustable over a range of, for example, about two feet along base 11, among other ranges (e.g., smaller or greater), depending on a desired implementation. In this manner, restraining system 10-5 enables various length loads (e.g., 8, 9, or 10 feet long) to be restrained in various length pickup truck beds (e.g., 6 or 8 feet long).

FIGS. 16A-16C are diagrams depicting load restraining system 10-6 that is configured to restrain a load in a pickup truck. Load restraining system 10-6 comprises base 11, load restraining component 12, and anchor 13. Anchor 13 is configured to anchor load restraining system 10-6 to a pickup truck. Load restraining component 12 is configured to prevent cargo from falling out of the pickup truck. Base 11 is connected to load restraining component 12 and to anchor 13. Support component 14 is attached to base 11 and load restraining component 12 and is configured to prevent load restraining component 12 from bending as a result of force applied by a load (e.g., during acceleration of the pickup truck).

Restraining component 12 and support component 14 may be repositioned along base 11 so that load restraining system 10-6 may accommodate different size loads and pickup trucks. Restraining component 12 and support component 14 may be inserted into respective holes 25 (located in base 11) that correspond to the desired load measurement. Restraining component 12 and support component 14 may be adjustable over a range of, for example, about two feet along base 11, among other ranges (e.g., smaller or greater), depending on a desired implementation. In this manner, restraining system 10-6 enables various length loads (e.g., 8, 9, or 10 feet long) to be restrained in various length pickup truck beds (e.g., 6 or 8 feet long).

FIGS. 17A-17B are diagrams depicting load transport system 70. Load transport system 70 includes load restraining system 10 that is configured to restrain load 73 in a pickup truck. Load restraining system 10 is placed on top of the pickup truck such that anchor 13 is located (at least in part) between pickup truck bed 72 and tailgate 71. Load 73 is placed on top of load restraining system 10 such that it is restrained by restraining component 12. Load 73 may be significantly larger than load restraining system 10 as shown in FIG. 17B. Load 73 may comprise, for example, rectangular sheets of building material (e.g., plywood, sheetrock, and/or paneling).

FIG. 18 is a method 80 for restraining a load in a pickup truck. Method 80 includes: opening a tailgate of a pickup truck (step 81); placing a restraint system on the pick-up truck such that the anchor of the restraint system is located between the pickup truck bed and the tailgate (step 82); and placing a load on top of at least a portion of the restraint system such that the load is restrained by a load restraining component of the restraint system (step 83).

FIG. 19 is a conceptual block diagram of load transport system 70. Load transport system 90 includes load restraining system 10 that is configured to restrain load 73 in pickup truck 90. Load restraining system 10 is placed on top of pickup truck 90, and load 73 is placed on top of load restraining system 10.

FIGS. 20A-20B are diagrams depicting the opening and closing of load restraining component 12 on hinge 101 in load restraining system 10-1. Load restraining system 10-1 depicted in FIGS. 11A-11C may comprise hinge 101 located between base 11 and load restraining component 12. Hinge 101 may allow load restraining component 12 to open from a vertical position in FIG. 20A to a horizontal position level with base 11 in FIG. 20B. This opening of load restraining component 12 may allow for loading of a load onto base 11.

FIGS. 20C-20D are diagrams depicting the opening and closing of load restraining component 12 on hinge 101 of load restraining system 10-3. Load restraining system 10-1 depicted in FIGS. 13A-13C may comprise hinge 101 located between base 11 and load restraining component 12. Hinge 101 may allow load restraining component 12 to open from a vertical position in FIG. 20C to a horizontal position level with base 11 in FIG. 20D.

FIGS. 21A-21C are diagrams of Y-strap 110 configured to restrain a load. The Y-strap 110 comprises connector 116, connector 117, connector 118, strap 111, strap 112, strap 113, connector 114, and ratchet 115. Strap 111, strap 112, and strap 113 may comprise the same material (e.g., nylon, rope, or any other suitable material), and they may be various lengths. Connector 114 may comprise the same material as straps 111, 112, and 113 or any other suitable material, and connector 114 connects all the straps together in Y-strap 110. Connector 116 may comprise an attachment device 119 (FIG. 21C) which may be any suitable device to attach Y-strap 110 to the end of a load, to load restraining system 10 (FIGS. 11A-11C), or to gap strap 140 (FIGS. 24A-24D). Connector 117 and connector 118 may have an attachment device (not shown) and attachment device 120 (FIG. 21C) respectively. The attachment devices may comprise a hook, a latch, or any other suitable device to attach Y-strap 110 to a pickup truck bed or cab. Ratchet 115 is configured to tighten Y-strap 110 by adjusting the length of strap 111 responsive to the attached load.

FIGS. 22A-22D are diagrams of Y-strap 110 attached to load restraining system 10. Y-strap 110 may be connected to load restraining system 10-1 (FIG. 22A), to load restraining system 10-2 (FIG. 22B), to load restraining system 10-3 (FIG. 22C), to load restraining system 10-4 (FIG. 22D), or to any other embodiment of load restraining system 10. Y-strap 110 comprises attachment device 121 which connects Y-strap 110 to load restraining system 10 at load restraining component 12. Attachment device 121 may, for example, comprise a hook, a latch, or any other suitable device. Y-strap 110 also comprises attachment device 122 and an attachment device (not shown) to connect straps 112 and 113 to pickup truck 120. Additionally, the attachment devices may connect Y-strap 110 to a pickup truck bed or wall.

FIGS. 23A-23B are diagrams depicting load transport system 130 comprising Y-strap 110 attached to load restraining system 10. Load transport system 130 comprises tail gate 71, pickup truck bed 72, truck 120, load 73, Y-strap 110, and load restraining system 10. Load 73 is placed on load restraining system 10 which is on pickup truck bed 72 and on tail gate 71. Load 73 may comprise, for example, rectangular sheets of building material (e.g., plywood, sheetrock, and/or paneling). Y-strap 110 is connected to load restraining system 10 at load restraining component 12, and Y-strap 110 is connected to truck 120 with attachment device 122 and attachment device 123.

FIGS. 24A-24B are diagrams depicting adjustable gap strap 140 to secure a load. Gap strap 140-1 may comprise ratchet 142 and strap 143, which can be suitably modified to add strap blocks 144, 145, as now described. Gap strap 140-2 may comprise ratchet 142, strap 143, strap block 144, and strap block 145. Ratchet 142 may be used to adjust the length of strap 143 responsive to a load size. Strap block 144 and strap block 145 may comprise, for example, rubber blocks attached to strap 143. Strap block 144 and strap block 145 may be placed in a pickup truck in the gap between the pickup truck bed and the tailgate to allow gap strap 140-2 to be used to secure a load without the use of external attachments.

FIGS. 25A-25B are diagrams depicting load transport system 150 comprising gap strap 140-2 configured to secure load 73 on pickup truck bed 72 and tail gate 71. Load transport system 150 comprises load 73, gap strap 140-1, tail gate 71, and pickup truck bed 72. Gap strap 140-1 is connected around load 73 with ratchet 142 adjusting strap 143 to a length responsive to load 73 size.

FIGS. 25C-25D are diagrams depicting load transport system 151 comprising gap strap 140-2 configured to secure load 73 on pickup truck bed 72 and tail gate 71. Load transport system 151 comprises load 73, gap strap 140-2, tail gate 71, and pickup truck bed 72. Gap strap 140-2 is connected around load 73 with ratchet 142 adjusting strap 143 to a length responsive to load 73 size. Gap strap 140-2 comprises strap block 144, 145 which is located between tail gate 71 and pickup truck bed 72. Strap block 144, 145 holds gap strap 140-2 in place with load 73 attached. It is appreciated that a single block 144, 145 can be advantageously implemented.

Figures 26A, 26B:
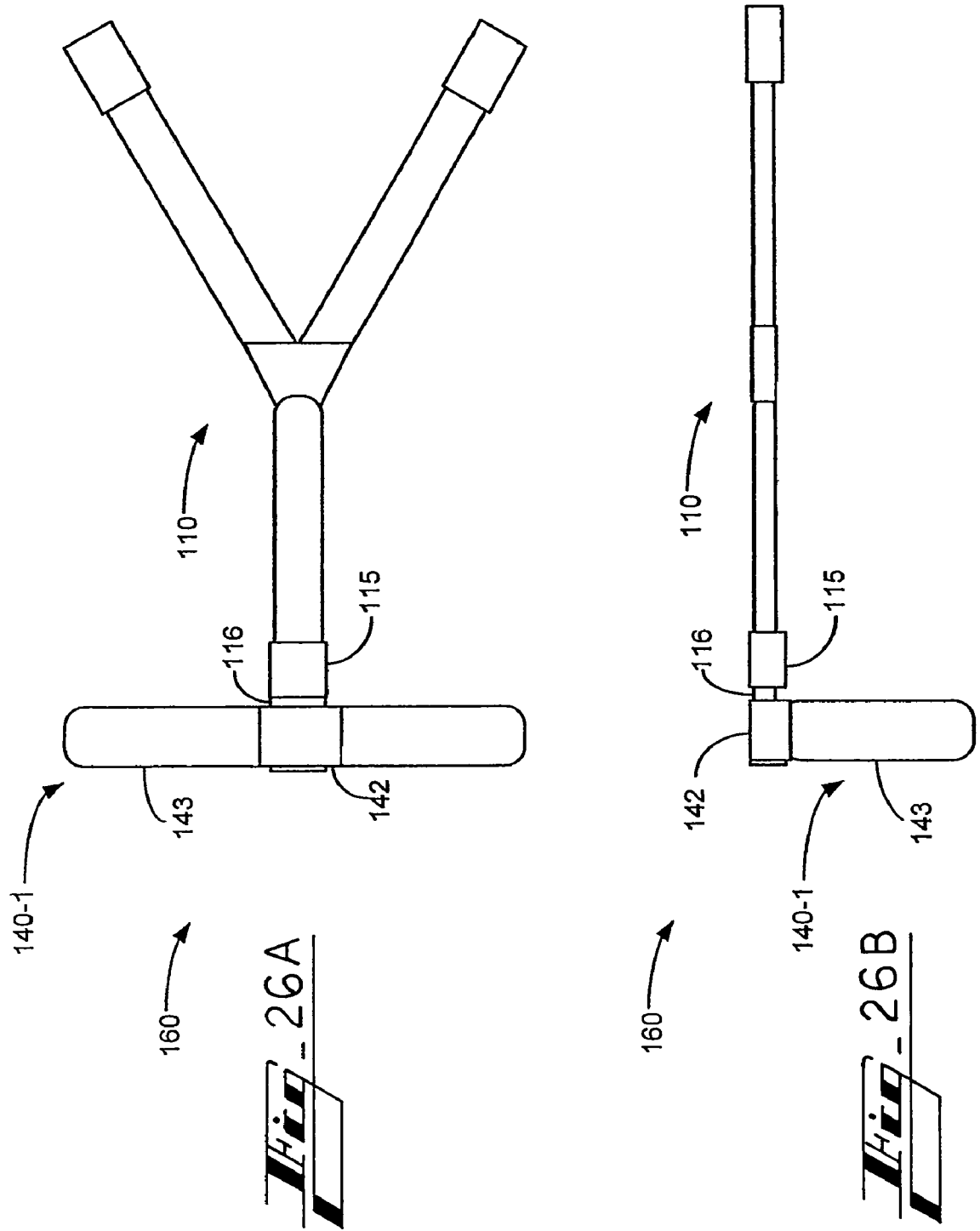

FIGS. 26A-26B are diagrams depicting Y-strap 110 attached to gap strap 140-1 to secure a load. Y-strap 110 is depicted in FIGS. 11A-11B. Gap strap 140-1 is depicted in FIG. 24A. Y-strap 110 comprises attachment device 116 which connects to gap strap 140-1. Attachment device 116 may comprise, for example, a metal plate with holes to hold strap 143 from gap strap 140-1 and a strap from Y-strap 110.

FIGS. 26C-26D are diagrams depicting Y-strap 110 attached to gap strap 140-2 to secure a load. Y-strap 110 is depicted in FIGS. 21A-21B. Gap strap 140-2 is depicted in FIG. 14B. Y-strap 110 comprises attachment device 116 which connects to gap strap 140-2. Attachment device 116 may comprise, for example, a metal plate with holes to hold strap 143 from gap strap 140-2 and a strap from Y-strap 110.

Figure 27A:
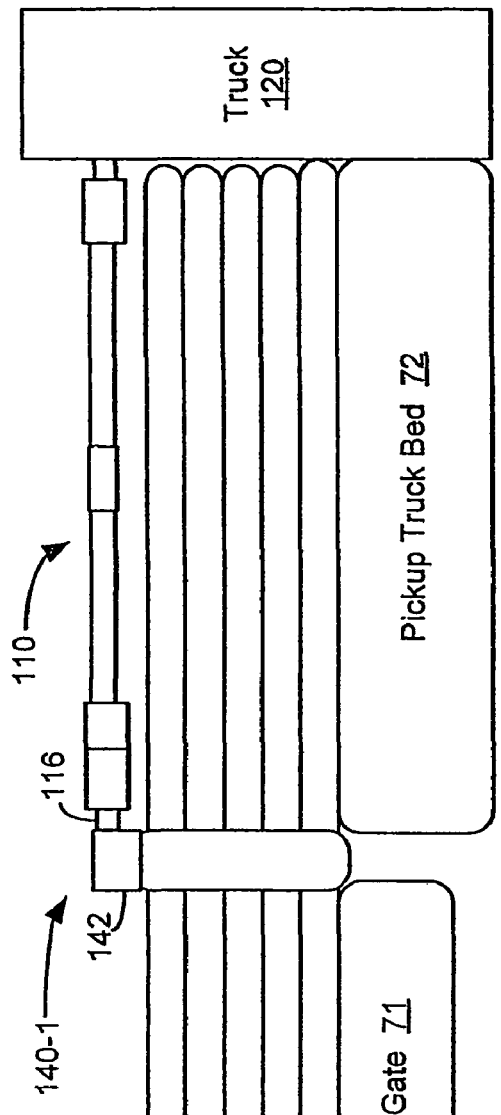
Figure 27B:
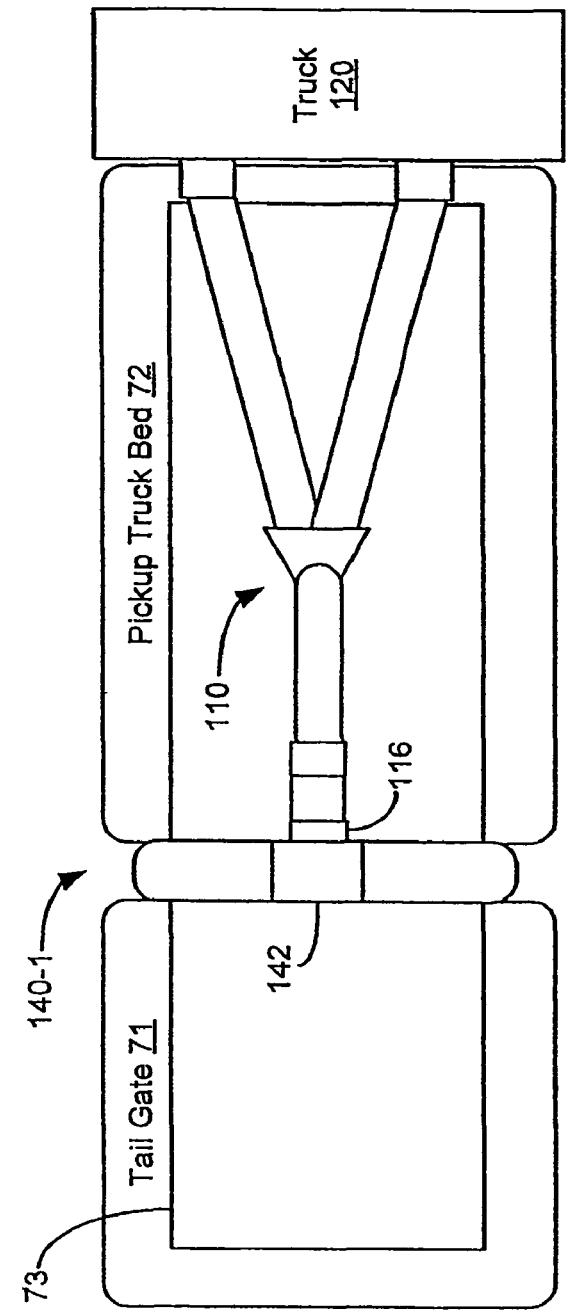

FIGS. 27A-27B are diagrams depicting load transport system 170 comprising Y-strap 110 attached to gap strap 140-1 to secure load 73 on pickup truck bed 72 and tail gate 71. Load transport system 170 comprises load 73, tail gate 71, pickup truck bed 72, truck 120, Y-strap 110, and gap strap 140-1. Load 73 is located on open tail gate 71 and pickup truck bed 72. Gap strap 140-1 is attached around load 73. Y-strap 110 is connected to gap strap 140-1 by attachment device 116. Y-strap 110 connects to truck 120 as depicted in FIGS. 22A-22D.

FIGS. 27C-27D are diagrams depicting load transport system 171 comprising Y-strap 110 attached to gap strap 140-2 to secure load 73 on pickup truck bed 72 and tail gate 71. Load transport system 170 comprises load 73, tail gate 71, pickup truck bed 72, truck 120, Y-strap 110, and gap strap 140-2. Load 73 is located on open tail gate 71 and pickup truck bed 72. Gap strap 140-2 is attached around load 73 and held in place with strap block 145 located between tail gate 71 and pickup truck bed 72. Y-strap 110 is connected to gap strap 140-2 by attachment device 116. Y-strap 110 connects to truck 120 as depicted in FIGS. 22A-22D.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A load restraining apparatus, comprising:
   a bar-like, elongated base, said elongated base comprising:
   an upper, load-bearing surface; and
   a plurality of spaced-apart elongated slots, the openings of said slots oriented perpendicularly to said upper surface and arranged end-to-end along the length of said elongated base;
   a load restraining component disposed along said elongated base, and abutting said upper surface of said base, an edge of said elongated base and an edge of said load restraining component together defining an "L" shape; and
   an anchor connected to said base, and on a lower surface of said base,
   wherein, in installed configuration, said anchor is adapted to extend into a space between a bed and a tailgate of a pickup truck and engage at least a portion of the tailgate, and wherein a portion of said elongated base, together with said load restraining component, extends beyond the bed and is supported by the tailgate;
   whereby, when a portion of a load is positioned in contact with an upper surface of the pickup truck bed, and a portion of the load is positioned in contact with said upper surface of said elongated base, the load is restrained from movement toward the tailgate by said load restraining component.

2. The apparatus as claimed in claim 1 wherein said load restraining component is positioned on an end of said elongated base on an upper surface of said base, and wherein said load restraining component has a generally triangular profile.

3. The apparatus as claimed in claim 2 further comprising a through-slot oriented on said load restraining component.

4. The apparatus as claimed in claim 2 wherein said anchor is positioned along said base on a bottom surface of said base.

5. The apparatus as claimed in claim 1 wherein said anchor is coupled to one of said plurality of slots.

6. The apparatus of claim 1, wherein said elongated base further comprises a tapered edge, said tapered edge defined on an opposing end of said elongated base relative to said load restraining component, and said tapered edge defining an obtuse angle relative to the bed of the pickup truck.

7. The apparatus of claim 1, wherein said load restraining component comprises a support component.

8. The apparatus of claim 1, wherein a position of said anchor relative to said load restraining component is adjustable.

9. The apparatus of claim 1, wherein said load restraining component extends generally perpendicularly from said elongated base, and wherein said load restraining component comprises a support component adapted to resist bending of said load restraining component relative to said elongated base.

10. The apparatus of claim 1, wherein said load restraining component is adapted to prevent a load sliding within a bed of a pickup truck.

11. The apparatus of claim 1, wherein said load restraining component includes a slot adapted to receive a strap.

12. The apparatus of claim 1, wherein a position of said anchor relative to said elongated base is adjustable.

13. The apparatus of claim 1, wherein said anchor is removably engageable with said elongated base via a bolt.

14. An apparatus for restraining a load within a bed of a pickup truck having a tailgate, said apparatus comprising:

a bar-like, elongated base comprising a tapered edge at a first end thereof, said tapered edge defining an obtuse angle relative to an upper surface of the bed of the pickup truck; an upper, load-bearing surface; and a plurality of spaced-apart elongated slots, the openings of said slots oriented perpendicularly to said upper surface and arranged end-to-end along the length of said elongated base;

a load restraining component extending generally perpendicularly from a second end of said elongated base and abutting an upper surface of said base; and an anchor adapted to connect via one of said slots to said base adjacent a lower surface of said base, and extending generally perpendicularly from said elongated base in a direction opposite said load restraining component, for engaging a space between the bed of the pickup truck and the tailgate of the pickup truck;

wherein a portion of said elongated base, together with said load restraining component, extends beyond the bed and is supported by the tailgate;

and wherein the length and width of the restrained load is limited only by the dimensions of a pickup truck bed interior.

15. The apparatus of claim 14, wherein a position of said anchor relative to said load restraining component is adjustable.

* * * * *